US012811185B2

(12) United States Patent
Gaben

(10) Patent No.: US 12,811,185 B2
(45) Date of Patent: Nov. 24, 2026

(54) ELECTROLYTES FOR THIN LAYER ELECTROCHEMICAL DEVICES

(71) Applicant: I-TEN, Dardilly (FR)

(72) Inventor: Fabien Gaben, Dardilly (FR)

(73) Assignee: I-TEN (FR)

( * ) Notice: Subject to any disclaimer, the term of this patent is extended or adjusted under 35 U.S.C. 154(b) by 914 days.

(21) Appl. No.: 17/049,990

(22) PCT Filed: May 6, 2019

(86) PCT No.: PCT/FR2019/051033
§ 371 (c)(1),
(2) Date: Oct. 23, 2020

(87) PCT Pub. No.: WO2019/215411
PCT Pub. Date: Nov. 14, 2019

(65) Prior Publication Data

US 2021/0234189 A1 Jul. 29, 2021

(30) Foreign Application Priority Data

May 7, 2018 (FR) ....................................... 1853924

(51) Int. Cl.

| | |
|---|---|
| ***H01M 10/056*** | (2010.01) |
| ***H01G 11/52*** | (2013.01) |
| ***H01M 10/0525*** | (2010.01) |
| ***H01M 10/0585*** | (2010.01) |
| ***H01M 50/434*** | (2021.01) |
| *H01G 11/62* | (2013.01) |

(52) U.S. Cl.
CPC .......... *H01M 10/056* (2013.01); *H01G 11/52* (2013.01); *H01M 10/0525* (2013.01); *H01M 10/0585* (2013.01); *H01M 50/434* (2021.01); *H01G 11/62* (2013.01); *H01M 2300/0025* (2013.01); *H01M 2300/0085* (2013.01)

(58) Field of Classification Search
CPC .......................... H01M 50/434; H01M 50/431
See application file for complete search history.

(56) References Cited

U.S. PATENT DOCUMENTS

| | | | | |
|---|---|---|---|---|
| 10,971,761 B2 * | 4/2021 | Hu | .......................... | H01M 4/62 |
| 2007/0190427 A1 * | 8/2007 | Carlson | ............... | C04B 38/0074 429/251 |
| 2012/0003524 A1 * | 1/2012 | Jo | ......................... | H01M 50/42 429/144 |
| 2012/0100440 A1 * | 4/2012 | Narula | ................ | H01M 10/052 429/207 |

(Continued)

FOREIGN PATENT DOCUMENTS

| | | | | |
|---|---|---|---|---|
| KR | 2017076246 A * | 7/2017 | .......... | H01M 10/052 |

OTHER PUBLICATIONS

KR-2017076246-A Translation from Espacenet (Year: 2017).*
Office Action received in CA Application No. 3098639, Dated Mar. 18, 2024, pp. 8.

*Primary Examiner* — Nathanael T Zemui
(74) *Attorney, Agent, or Firm* — Harness, Dickey & Pierce, P.L.C.

(57) ABSTRACT

Thin-layer electrolyte in an electrochemical device such as a lithium-ion battery, said electrolyte comprising a porous inorganic layer impregnated with a phase carrying lithium ions, characterized in that said porous inorganic layer has an interconnected network of open pores.

7 Claims, 2 Drawing Sheets

(56) References Cited

U.S. PATENT DOCUMENTS

| | | | | |
|---|---|---|---|---|
| 2013/0189590 | A1 | 7/2013 | Jean-Marc et al. | |
| 2014/0272526 | A1* | 9/2014 | Huang | H01M 10/0525 429/246 |
| 2018/0358652 | A1* | 12/2018 | Lim | H01M 50/434 |
| 2019/0058177 | A1* | 2/2019 | Herle | H01G 11/52 |
| 2020/0006807 | A1* | 1/2020 | Chen | H01M 10/0562 |
| 2020/0112050 | A1* | 4/2020 | Hu | H01M 10/0525 |
| 2021/0167463 | A1* | 6/2021 | Smith | H01M 50/403 |

* cited by examiner

ELECTROLYTES FOR THIN LAYER ELECTROCHEMICAL DEVICES

This application is a national stage application PCT application number PCT/FR2019/051033 filed on May 6, 2019, which claims priority of French patent application No. 1853924 filed on May 7, 2018, both disclosures are incorporated herein by reference.

TECHNICAL FIELD OF THE INVENTION

The invention relates to the field of electrochemistry, and more particularly thin-layer electrochemical systems. It relates more precisely to thin layer electrolytes that can be used in electrochemical systems such as high-power batteries (in particular lithium-ion batteries) or supercapacitors. The invention relates more particularly to an electrolyte comprising a porous inorganic layer impregnated with a phase carrying lithium ions and a method for preparing such a thin-layer electrolyte. The invention also relates to a method for manufacturing an electrochemical device comprising at least one such electrolyte, and the devices thus obtained.

STATE OF THE ART

A lithium-ion battery is an electrochemical component that makes it possible to store electrical energy. Generally, it is comprised of one or more elementary cells, and each cell comprises two electrodes with different potentials and an electrolyte. Various types of electrodes can be used in secondary lithium-ion batteries. A cell can comprise two electrodes separated by a polymeric porous membrane (also called "separator") or a ceramic porous membrane impregnated with a liquid electrolyte containing a lithium salt.

For example, patent application JP 2002-042792 describes the carrying out of an electrolyte layer on an electrode of a battery. The target electrolytes are substantially polymeric membranes such as polyethylene oxide, polyacrylonitrile, poly(vinylidene fluoride) of which the pores are impregnated by a lithium salt such as $LiPF_6$. According to the teachings of this document, the size of the particles deposited by electrophoresis must preferably be less than 1 μm, and the thickness of the layer formed is preferably less than 10 μm. In such a system, the liquid electrolyte migrates into the pores contained in the membrane and to the electrodes and thus provides ionic conduction between the electrodes.

With the purpose of creating high power thin-layer batteries and reducing the resistance to transport of the lithium ions between the two electrodes, it was sought to increase the porosity of the polymeric membrane. However, increasing the porosity of the polymeric membranes facilitates the precipitation of metal lithium dendrites in the pores of the polymeric membrane during the charging and discharging cycles of the battery. These dendrites are the origin of internal short-circuits within the cell that can induce a risk of thermal runaway of the battery.

It is known that these polymeric membranes impregnated with a liquid electrolyte have a lower ionic conductivity than the liquid electrolyte used. In order to facilitate ionic conduction between the electrodes and the electrolyte, thin polymeric membranes were used. However, these polymeric membranes are mechanically fragile and their electrical insulation properties can be altered under the effect of strong electrical fields such as is the case in batteries charged with electrolyte films of a very thin thickness, or under the effect of mechanical and vibratory stresses. These polymeric membranes tend to break during charging and discharging cycles, causing the detaching of particles of anode and cathode, inducing electrical insulation losses causing short-circuits between the two positive and negative electrodes, which can lead to dielectric breakdown. This phenomenon is furthermore accentuated in batteries that use porous electrodes.

To improve mechanical resistance, Ohara has proposed, in particular in patent application EP 1049188 A1 and patent EP 1 424 743 1, using electrolytes comprised of a polymeric membrane containing lithium ion-conducting vitroceramic particles.

Moreover, it is known from Maunel et al. (Polymer 47 (2006) p. 5952-5964) that adding ceramic charges in the polymer matrix makes it possible to improve the morphological and electrochemical properties of the polymeric electrolytes; these ceramic charges can be active (such as $Li_2N$, $LiAl_2O_3$), in which case they participate in the process of transporting lithium ions, or be passive (such as $Al_2O_3$, $SiO_2$, MgO), in which case they do not participate in the process of transporting lithium ions. The size of the particles and the characteristics of the ceramic charges influence the electrochemical properties of the electrolytes, see Zhang et al., "Flexible and ion-conducting membrane electrolytes for solid-state lithium batteries: Dispersions of garnet nanoparticles in insulating POE", NanoEnergy, 28 (2016) p. 447-454. However, these membranes are relatively fragile and easily break under the effect of mechanical stresses induced during the assembly of batteries.

The present invention seeks to overcome at least a portion of the disadvantages of the prior art mentioned hereinabove.

More precisely, the problem that the present invention seeks to resolve is to propose electrolytes that have a high ionic conductivity, a stable mechanical structure, good thermal stability, a substantial service life, and that do not give rise to any safety problem.

Another problem that this invention seeks to resolve is to provide a method of manufacturing such a thin-layer electrolyte that is simple, safe, fast, easy to implement, easy to industrialize and inexpensive.

Another purpose of the invention is to propose electrodes for batteries that can operate reliably and without the risk of fire.

Another problem is to provide an electrolyte that does contain any organic binder, because such a binder can, in case of an internal short-circuit of the battery, cause and feed a fire.

Another purpose of the invention is to provide a battery with a rigid structure that has a high power density able to mechanically resist impacts and vibrations.

Another purpose of the invention is to provide a method for manufacturing an electronic, electric or electrotechnical device such as a battery, a capacitor, a supercapacitor comprising an electrolyte according to the invention.

Another objective of the invention is to propose devices such as batteries, lithium ion battery cells, capacitors, supercapacitors that have increased reliability and have a longer service life and that can be encapsulated by coatings deposited by the atomic layer deposition technique (ALD), at a high temperature and under reduced pressure.

Yet another purpose of the invention is to propose devices such as batteries, lithium-ion battery cells, capacitors, supercapacitors, able to store a high energy density, restore this energy with a very high power density (in particular in the capacitors and supercapacitors), resist high temperatures, have a high service life duration and be able to be encapsulated by coating deposited by ALD at a high temperature and under reduced pressure.

Purposes of the Invention

According to the invention the problem is resolved by the use of at least one thin-layer electrolyte in an electrochemical device such as a lithium-ion battery, said electrolyte comprising an porous inorganic layer having an interconnected network of open pores impregnated with a phase carrying lithium ions. Preferably, the porous inorganic layer has a mesoporous structure of which the porosity is greater than 25% by volume, preferably greater than 30% by volume.

Advantageously, the open pores of said porous inorganic layer have an average diameter $D_{50}$ less than 100 nm, preferably less than 80 nm, preferably comprised between 2 nm and 80 nm, and more preferably comprised between 2 nm and 50 nm, and volume greater than 25% of the total volume of said thin-layer electrolyte, and preferably greater than 30%.

Advantageously, the open pores of said porous inorganic layer have a volume comprised between 30% and 50% of the total volume of said thin-layer electrolyte.

Preferably, said porous inorganic layer is organic binder-free.

Advantageously, the thickness of the thin-layer electrolyte is less than 10 μm, preferably comprised between 3 μm and 6 μm, and preferably comprised between 2.5 μm and 4.5 μm.

Advantageously, said porous inorganic layer comprises an electronically-insulating material, preferably chosen from $Al_2O_3$, $SiO_2$, $ZrO_2$, and/or a material selected in the group formed by:

- garnets of formula $Li_d A^1_x A2_y(TO_4)_z$ where
  - $A^1$ represents a cation of oxidation state +II, preferably Ca, Mg, Sr, Ba, Fe, Mn, Zn, Y, Gd; and where
  - $A^2$ represents a cation of oxidation state +III, preferably Al, Fe, Cr, Ga, Ti, La; and where
  - $(TO_4)$ represents an anion wherein T is an atom of oxidation state +IV, located at the center of a tetrahedron formed by the oxygen atoms, and wherein $TO_4$ advantageously represents the silicate or zirconate anion, knowing that all or a portion of the elements T of an oxidation state +IV can be replaced by atoms of an oxidation state +111 or +V, such as Al, Fe, As, V, Nb, In, Ta;
  - knowing that: d is comprised between 2 and 10, preferably between 3 and 9, and more preferably between 4 and 8; x is comprised between 2.6 and 3.4 (preferably between 2.8 and 3.2); y is comprised between 1.7 and 2.3 (preferably between 1.9 and 2.1) and z is comprised between 2.9 and 3.1;
- garnets, preferably chosen from: $Li_7La_3Zr_2O_{12}$; $Li_6La_2BaTa_2O_{12}$; $Li_{5.5}La_3Nb_{1.5}In_{0.25}O_{12}$; $Li_5La_3M_2O_{12}$ with M=Nb or Ta or a mixture of the two compounds; $Li_{7-x}Ba_xLa_{3-x}M_2O_{12}$ with 0≤x≤1 and M=Nb or Ta or a mixture of the two compounds; $Li_{7-x}La_3Zr_{2-x}M_xO_{12}$ with 0≤x≤2 and M=Al, Ga or Ta or a mixture of two or three of these compounds;
- lithium phosphates, preferably chosen from: lithium phosphates of the NaSICON type, $Li_3PO_4$; $LiPO_3$; $Li_3Al_{0.4}Sc_{1.6}(PO_4)_3$ called "LASP"; $Li_{1.2}Zr_{1.9}Ca_{0.1}(PO_4)_3$; $LiZr_2(PO_4)_3$; $Li_{1+3x}Zr_2(P_{1-x}Si_xO_4)_3$ with 1.8<x<2.3; $Li_{1+6x}Zr_2(P_{1-x}B_xO_4)_3$ with 0≤x≤0.25; $Li_3(Sc_{2-x}M_x)(PO_4)_3$ with M=Al or Y and 0≤x≤1; $Li_{1+x}M_x(Sc)_{2-x}(PO_4)_3$ with M=Al, Y, Ga or a mixture of the three compounds and 0≤x≤0.8; $Li_{1+x}M_x(Ga_{1-y}Sc_y)_{2-x}(PO_4)_3$ with 0≤x≤0.8; 0≤y≤1 and M=Al or Y or a mixture of the two compounds; $Li_{1+x}M_x(Ga)_{2-x}(PO_4)_3$ with M=Al, Y or a mixture of the two compounds and 0≤x≤0.8; $Li_{1+x}Al_xTi_{2-x}(PO_4)_3$ with 0≤x≤1 called "LATP"; or $Li_{1+3x}Al_xGe_{2-x}(PO_4)_3$ with 0≤x≤1 called "LAGP"; or $Li_{1+x+z}M_x(Ge_{1-y}Ti_y)_{2-x}Si_zP_{3-z}O_{12}$ with 0≤x≤0.8 and 0≤y≤1.0 & 0≤z≤0.6 and M=Al, Ga or Y or a mixture of two or three of these compounds; $Li_{3+y}(Sc_{2-x}M_x)Q_yP_{3-y}O_{12}$, with M=Al and/or Y and Q=Si and/or Se, 0≤x≤0.8 and 0≤y≤1; or $Li_{1-x-y}M_xSC_{2-x}Q_yP_{3-y}O_{12}$, with M=Al, Y, Ga or a mixture of the three compounds and Q=Si and/or Se, 0≤x≤0.8 and 0≤y≤1; or $Li_{1+x+y+z}M_x(Ga_{1-y-y}Sc_y)_{2-x}Q_zP_{3-z}O_{12}$ with 0≤x≤0.8; 0≤y≤1; 0≤z≤0.6 with M=Al or Y or a mixture of the two compounds and Q=Si and/or Se; or $Li_{t+x}Zr_{2-x}B_x(PO_4)_3$ with 0≤x≤0.25; or $Li_{1+x}Zr_{2-x}Ca_x(PO_4)_3$ with 0≤x≤0.25; or $Li_{1+x}M^3_xM_{2-x}P_3O_{12}$ with 0≤x≤1 and $M^3$=Cr, V, Ca, B, Mg, Bi and/or Mo, M=Sc, Sn, Zr, Hf, Se or Si, or a mixture of these compounds;
- lithium borates, preferably chosen from: $Li_3(Sc_{2-x}M_x)(BO_3)_3$ with M=Al or Y and 0≤x≤1; $Li_{1+x}M_x(Sc)_{2-x}(BO_3)_3$ with M=Al, Y, Ga or a mixture of the three compounds and 0≤x≤0.8; $Li_{1+x}M_x(Ga_{1-y}Sc_y)_{2-x}(BO_3)_3$ with 0≤x≤0.8, 0≤y≤1 and M=Al or Y; $Li_{1+x}M_x(Ga)_{2-x}(BO_3)_3$ with M=Al, Y or a mixture of the two compounds and 0≤x≤0.8; $Li_3BO_3$, $Li_3BO_3$—$Li_2SO_4$, $Li_3BO_3$—$Li_2SiO_4$, $Li_3BO_3$—$Li_2SiO_4$—$Li_2SO_4$;
- oxinitrides, preferably chosen from $Li_3PO_{4-x}N_{2x/3}$, $Li_4SiO_{4-x}N_{2x/3}$, $Li_4GeO_{4-x}N_{2x/3}$ with 0<x<4 or $Li_3BO_{3-x}N_{2x/3}$ with 0<x<3;
- lithium compounds based on lithium oxinitride and phosphorus, called "LiPON", in the form $Li_xPO_yN_z$ with x ~2.8 and 2y+3z~7.8 and 0.16 z 0.4, and in particular Li2.9PO3.3N0.46, but also the compounds $Li_wPO_xN_yS_z$ with 2x+3y+2z=5=w or the compounds $Li_wPO_xN_yS_z$ with 3.2<x<3.8, 0.13≤y≤0.4, 0≤z≤0.2, 2.9≤w≤3.3 or the compounds in the form of $Li_tP_xAl_yO_uN_vS_w$ with 5x+3y=5, 2u+3v+2w=5+t, 2.9≤t≤3.3, 0.84≤x≤0.94, 0.094≤y≤0.26, 3.2≤u≤3.8, 0.13≤v≤0.46, 0≤w≤0.2;
- materials based on lithium phosphorus or boron oxinitrides, respectively called "LiPON" and "LiBON", also able to contain silicon, sulfur, zirconium, aluminum, or a combination of aluminum, boron, sulfur and/or silicon, and boron for the materials based on lithium phosphorus oxinitrides;
- lithium compounds based on lithium, phosphorus and silicon oxinitride called "LiSiPON", and particularly $Li_{1.9}Si_{0.28}P_{1.0}O_{1.1}N_{1.0}$;
- lithium oxinitrides of the LiBON, LiBSO, LiSiPON, LiSON, thio-LiSiCON, LiPONB types (where B, P and S represent boron, phosphorus and sulfur respectively);
- lithium oxinitrides of the LiBSO type such as (1-x) $LiBO_{2-x}$ $Li_2SO_4$ with 0.4≤x≤0.8;
- lithium oxides, preferably chosen from $Li_7La_3Zr_2O_{12}$ or $Li_{5+x}La_3(Zr_x,A_{2-x})O_{12}$ with A=Sc, Y, Al, Ga and 1.4≤x≤2 or $Li_{0.35}La_{0.55}TiO_3$ or $Li3xLa_{2/3-x}TiO_3$ with 0≤x≤0.16 (LLTO);
- silicates, preferably chosen from $Li_2Si_2O_5$, $Li_2SiO_3$, $Li_2Si_2O_6$, $LiAlSiO_4$, $Li_4SiO_4$, $LiAlSi_2O_6$;
- solid electrolytes of the anti-perovskite type chosen from: $Li_3OA$ with A a halide or a mixture of halides, preferably at least one of the elements chosen from F, Cl, Br, I or a mixture of two or three or four of these elements; $Li_{(3-x)}M_{x/2}OA$ with 0<x≤3, M a divalent metal, preferably at least one of the elements Mg, Ca, Ba, Sr or a mixture of two or three or four of these elements, A a halide or a mixture of halides, preferably at least one of the elements F, Cl, Br, I or a mixture of two or three or four of these elements; $Li_{(3-x)}M^3{}_{x/3}OA$ with $0 \leq x \leq 3$, $M^3$ a trivalent metal, A a halide or a mixture of halides, preferably at least one of the elements F, Cl, Br, I or a mixture of two or three or four of these elements; or $LiCOX_zY_{(1-z)}$, with X and Y halides such as mentioned hereinabove in relation with A, and $0 \leq z \leq 1$, the compounds $La_{0.51}Li_{0.34}Ti_{2.94}$, $Li_{3.4}V_{0.4}Ge_{0.6}O_4$, $Li_2O$—$Nb_2O_5$, $LiAlGaSPO_4$;

formulations based on $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where $0<x<1$), $Li_{1+x+y}Al_xTi_{2-x}Si_yP_{3-y}O_{12}$ (where $0 \leq x \leq 1$ and $0 \leq y \leq 1$).

Advantageously, said pores of the thin-layer electrolyte are impregnated with a phase carrying lithium ions, such an organic solvent or a mixture of solvents wherein at least one lithium salt is dissolved, and/or a polymer containing at least one lithium salt, and/or an ionic liquid or a mixture of ionic liquids, possibly diluted with a suitable solvent, containing at least one lithium salt.

Advantageously, said electrolyte pores, are impregnated with a phase carrying lithium ions comprising at least 50% by weight of at least one ionic liquid.

Said porous inorganic layer can be formed from an electrolyte material (or can comprise such a material), i.e. from a material within which lithium ions have sufficient mobility. Said porous inorganic layer can be constituted of a material (or can comprise such a material) that does not have any electronic conductivity or ionic conductivity that is sufficient for the lithium ions. In both cases the electrolyte layer is formed by said porous inorganic layer and by said phase carrying lithium ions with which it was impregnated. In the second case it is this phase carrying lithium ions that alone ensures the ionic conductivity in the electrolyte, while in the first case the mobility of the lithium ions within the material of the porous inorganic layer contributes to the ionic conductivity.

Said phase carrying lithium ions must include lithium ions. To form this carrying phase, the lithium ions can be dissolved in any suitable solvent. For example, said phase carrying lithium ions can comprise an ionic liquid, possibly diluted with a suitable solvent. It can also include a polymer, that can be dissolved with an suitable solvent, that can be liquid or at least sufficiently viscous to be able to invade the open porosity of the porous inorganic layer.

According to the invention said porous inorganic layer can be deposited by electrophoresis, by ink-jet, by doctor blade, by roll coating, by curtain coating or by dip-coating, from a colloidal suspension of nanoparticles of an electronically-insulating material or of a solid electrolyte material. Preferably it does not contain any binder. According to an essential characteristic of the invention this suspension includes aggregates or agglomerates of primary nanoparticles.

Said primary nanoparticles forming aggregates or agglomerates are preferably monodispersed, i.e. their primary diameter has a narrow distribution. This allows for better control of the porosity and a fortiori of the mesoporosity.

The heat treatment results in the partial coalescence of the nanoparticles of material (phenomenon called necking), knowing that nanoparticles have a high surface energy that is the driving force for this structural modification; the latter occurs at a temperature much lower than the melting point of the material, and after a rather short treatment time. Thus a three-dimensional mesoporous structure that has an single-piece binder-free interconnected network of open pores is created within which the lithium ions have a mobility that is not slowed by the grain boundaries or layers of binder. This partial coalescence of the aggregated nanoparticles allows for the transformation of the aggregates into agglomerates. The partial coalescence of the agglomerated nanoparticles induced by the heat treatment allows for the consolidation of the three-dimensional mesoporous structure.

This structure also provides good mechanical resistance of the layer even without binder.

The aggregates, respectively agglomerates, can also be obtained directly after hydrothermal synthesis if the suspension is not sufficiently purified: the ionic strength of the suspension then leads to the aggregation, respectively agglomeration of the primary nanoparticles to form aggregated, respectively agglomerated, particles of a larger size.

A second object of the invention is a method for manufacturing a thin-layer electrolyte deposited on an electrode, said layer being preferably free of organic binder and preferably having a porosity, preferably mesoporous, greater than 30% by volume, and more preferably comprised between 30% and 50% by volume, and said layer having pores with an average diameter Do less than 100 nm, preferably less than 80 nm and preferably less than 50 nm, said method being characterized in that:

(a) a colloidal suspension is provided, containing aggregates or agglomerates of nanoparticles of at least one inorganic material, said aggregates or agglomerates having an average diameter comprised between 80 nm and 300 nm (preferably between 100 nm to 200 nm),
(b) an electrode is provided,
(c) a porous inorganic layer is deposited on said electrode by electrophoresis, by ink-jet, by doctor blade, by roll coating, by curtain coating or by dip-coating, from a suspension of particles of inorganic material obtained in step (a);
(d) said porous inorganic layer is dried, preferably in an airflow to obtain a porous inorganic layer;
(e) said porous inorganic layer is treated by mechanical compression and/or heat treatment,
(f) said porous inorganic layer obtained in step (e) is impregnated with a phase carrying lithium ions.

Another object of the invention is a method for manufacturing a thin-layer electrolyte deposited on an electrode, said layer being preferably free of organic binder and preferably having a porosity, preferably mesoporous, greater than 30% by volume, and more preferably comprised between 30% and 50% by volume, and said layer having pores with an average diameter $D_{50}$ less than 100 nm, preferably less than 80 nm, preferably less than 50 nm, said method being characterized in that:

(a1) a colloidal suspension is provided including nanoparticles of at least one inorganic material P with a primary diameter $D_{50}$ less than or equal to 50 nm;
(a2) the nanoparticles present in said colloidal suspension are destabilized so as to form aggregates or agglomerates of particles with an average diameter comprised between 80 nm and 300 nm, preferably between 100 nm and 200 nm, said destabilization being done preferably by adding a destabilizing agent such as a salt, preferably LiOH;
(b) an electrode is provided;
(c) a porous inorganic layer is deposited on said electrode by electrophoresis, by ink-jet, by doctor blade, by roll coating, by curtain coating or by dip-coating, from said colloidal suspension comprising the aggregates or agglomerates of particles of at least one inorganic material obtained in step (a2);

(d) the porous inorganic layer is dried, preferably in an airflow to obtain a porous inorganic layer;

(e) said porous inorganic layer is treated by mechanical compression and/or heat treatment, (f) said porous inorganic layer obtained in step (e) is impregnated with a phase carrying lithium ions.

Advantageously, the porous inorganic layer obtained in step (c) has a thickness less than 10 μm, preferably less than 8 μm, and more preferably comprised between 1 μm and 6 μm.

Advantageously, the porous inorganic layer obtained in step (d) has a thickness less than 10 μm, preferably comprised between 3 μm and 6 μm, and preferably comprised between 2.5 μm and 4.5 μm.

Advantageously, the primary diameter of said nanoparticles is comprised between 10 nm and 50 nm, preferably between 10 nm and 30 nm.

Preferably, the average diameter of the pores is comprised between 2 nm and 50 nm, preferably comprised between 6 nm and 30 nm and more preferably between 8 nm and 20 nm.

The electrode is a dense electrode or a porous electrode, preferably a mesoporous electrode.

The method according to the invention can be used for the manufacture of thin-layer electrolytes, in electronic, electrical or electrotechnical devices selected from the group formed by: batteries, capacitors, supercapacitors, capacitors, resistors, inductances, transistors, photovoltaic cells.

Another object of the invention is a method for manufacturing a thin-layer battery according to the invention, and comprising the steps of:

—1—providing at least two conductive substrates covered beforehand with a layer of material that can be used as an anode and, respectively, as a cathode ("anode layer" 12 respectively "cathode layer" 22), —2—providing a colloidal suspension, containing aggregates or agglomerates of nanoparticles of at least one inorganic material, said aggregates or said agglomerates having an average diameter comprised between 80 nm and 300 nm (preferably between 100 nm to 200 nm), —3—Deposition of a porous inorganic layer by electrophoresis, by ink-jet, by doctor blade, by roll coating, by curtain coating or by dip-coating, from a suspension of aggregated particles of inorganic material obtained in step—2—on the cathode, respectively anode layer, obtained in step—1—, —4—Drying of the layer thus obtained in step—3—, preferably in an airflow, —5—Stacking of layers of cathode and anode, preferably offset laterally, —6—Treating the stack of anode and cathode layers obtained in step—5— by mechanical compression and/or heat treatment so as to juxtapose and assemble the porous inorganic layers present on the anode and cathode layers so as to obtain a rigid all-solid-state assembly, preferably organic binder-free.

—7—Impregnating of the structure obtained in step—6— with a phase carrying lithium ions, preferably with a phase carrying lithium ions comprising at least 50% by weight of at least one ionic liquid leading to the obtaining of an assembled stack, preferably a battery.

The order of steps—1— and—2— is not important.

Advantageously, the cathode is a dense electrode or a porous electrode or, preferably, a mesoporous electrode.

Advantageously, the anode is a dense electrode or a porous electrode or, preferably, a mesoporous electrode.

Advantageously, the dense electrode or the porous electrode or the mesoporous electrode is coated, preferably by atomic layer deposition ALD or by chemical solution deposition CSD, with a layer of an electronically-insulating material, preferably ion conducting, having preferably a thickness less than 5 nm. Advantageously, the cathode is a dense electrode or a dense electrode coated by ALD or by CSD with an electronically-insulating layer, preferably an electronically insulating and ionic conducting layer, or a porous electrode or a porous electrode coated by ALD or by CSD with an electronically-insulating layer, preferably an electronically insulating and ionic conducting layer or, preferably, a mesoporous electrode, or a mesoporous electrode coated by ALD or by CSD with an electronically-insulating layer, preferably an electronically insulating and ionic conducting layer and/or wherein the anode is a dense electrode or a dense electrode coated by ALD or by CSD with an electronically-insulating layer, preferably an electronically insulating and ionic conducting layer, or a porous electrode or a porous electrode coated by ALD or by CSD with an electronically-insulating layer, preferably an electronically insulating and ionic conducting layer or, preferably, a mesoporous electrode or a mesoporous electrode coated by ALD or by CSD with an electronically-insulating layer, preferably an electronically insulating and ionic conducting layer.

Advantageously, when the cathode and/or the anode is a porous or mesoporous electrode, impregnating the structure (i.e. stack treated by mechanical compression and/or heat treatment) with a phase carrying lithium ions in step 7 allows for the impregnating of the porous inorganic layer and of said cathode and/or of said anode.

Advantageously, after step—7—:

is deposited successively, alternating, on the battery:

at least one first layer of parylene and/or polymide on said battery, at least one second layer composed of an electrically-insulating material by ALD (Atomic Layer Deposition) on said first layer of parylene and or polyimide, and on the alternating succession of at least one first and of at least one second layer is deposited a layer making it possible to protect the battery from mechanical damage of the battery, preferably made of silicone, epoxy resin, or parylene or polyimide, thus forming an encapsulation system of the battery, the battery thus encapsulated is cut along two cutting planes to expose on each one of the cutting plans anode and cathode connections of the battery, in such a way that the encapsulation system covers four of the six faces of said battery, preferably continuously, is deposited successively, on and around, these anode and cathode connections:

optionally, a first electronically-conductive layer, preferably metallic, preferably deposited by ALD, a second layer with an epoxy resin base charged with silver, deposited on the first electronically-conductive layer, and a third layer with a nickel base, deposited on the second layer, and a fourth layer with a tin or copper base, deposited on the third layer.

Advantageously and alternatively, after step—6—:

is deposited successively, alternating, on the assembled stack, an encapsulation system formed by a succession of layers, namely a sequence, preferably z sequences, comprising:

a first covering layer, preferably chosen from parylene, parylene of the F type, polyimide, epoxy resins, silicone, polyamide and/or a mixture of the latter, deposited on the assembled stack, a second covering layer comprised of an electrically-insulating material, deposited by atomic layer deposition on said first covering layer, this sequence can be repeated z times with z≥1, a last covering layer is deposited on this succession of layers of a material chosen from epoxy resin, polyethylene naphtalate (PEN), polyimide, polyamide, polyurethane, silicone, sol-gel silica or organic silica, the assembled stack thus encapsulated is cut along two cutting planes to expose on each one of the cutting plans anode and cathode connections of the assembled stack, in such a way that the encapsulation system covers four of the six faces of said assembled stack, preferably continuously, in such a way as to obtain an elementary battery, and after step (7), is deposited successively, on and around these anode and cathode connections:

a first layer of a material charged with graphite, preferably epoxy resin charged with graphite, a second layer comprising metal copper obtained from an ink charged with nanoparticles of copper deposited on the first layer, the layers obtained are thermally treated, preferably by infrared flash lamp in such a way as to obtain a covering of the cathode and anode connections by a layer of metal copper, possibly, is deposited successively, on and around this first stack of terminations, a second stack comprising:

a first layer of a tin-zinc alloy deposited, preferably by dipping in a molten tin-zinc bath, so as to ensure the tightness of the battery at least cost, and a second layer with a pure tin base deposited by electrodeposition or a second layer comprising an alloy with a silver, palladium and copper base deposited on this first layer of the second stack.

Advantageously, the anode and cathode connections 50 are on the opposite sides of the stack.

Another object of the invention relates to a battery, preferably a lithium-ion battery, comprising at least one thin-layer electrolyte according to the invention.

Another object of the invention relates to a supercapacitor comprising at least one thin-layer electrolyte according to the invention.

BRIEF DESCRIPTION OF THE FIGURES

FIG. 1 shows nanoparticles before (FIG. 1(*a*)) and after (FIG. 1(*b*)) heat treatment, showing the necking phenomenon.

FIG. 2(*a*) shows a diffractogram, FIG. 2(*b*) a snapshot obtained by transmission electron microscopy of primary nanoparticles used for the deposition of porous electrodes by electrophoresis.

List of marks used in the figures:

TABLE 1

Figure 1A:
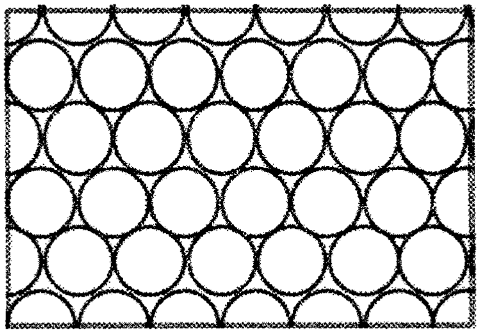
FIGS. 1 and 2 show different aspects of embodiments of the invention, without however limiting the scope thereof.

| | |
|---|---|
| 1 | Battery |
| 11 | Layer of a substrate used as a current collector |
| 12 | Anode layer |
| 13 | Electrolyte layer according to the invention |
| 21 | Layer of a substrate used as a current collector |
| 22 | Cathode layer |
| 23 | Electrolyte layer according to the invention |
| 30 | Encapsulation system |
| 40 | Termination |
| 50 | Anode and/or cathode connections |

DETAILED DESCRIPTION

1. Definitions

In the context of this document, the particle size is defined by its largest dimension. "Nanoparticle" refers to any particle or object of a nanometric size that has at least one of its dimensions less than or equal to 100 nm.

In the framework of this document, a material or an electronically-insulating layer, preferably an electronically-insulating and ionic conducting layer is a material or a layer of which the electrical resistance (resistance to the passage of electrons) is greater than $10^5$ Ω·cm.

"Ionic liquid" means any liquid salt, able to transport electricity, being differentiated from all molted salts by a melting temperature less than 100 C. Some of these salts remain liquid at ambient temperature and do not solidify, even at very low temperature. Such salts are called "ionic liquids at ambient temperature".

"Mesoporous materials" refers to any solid that has within its structure pores referred to as "mesopores" that have a size that is intermediate between that of micropores (width less than 2 nm) and that of macropores (width greater than 50 nm), namely a size comprised between 2 nm and 50 nm. This terminology corresponds to that adopted by IUPAC (International Union for Pure and Applied Chemistry), which is a reference for those skilled in the art. Therefore the term "nanopore" is not used here, although mesopores such as defined hereinabove have nanometric dimensions in terms of the definition of nanoparticles, knowing that pores of a size less than that of mesopores are called "micropores" by those skilled in the art.

A presentation of the concepts of porosity (and of the terminology that has just been disclosed hereinabove) is given in the article "Texture des matériaux pulvérulents ou poreux" by F. Rouquerol et al. published in the collection "Techniques de l'Ingénieur", traité Analyse et Caractérisation, fascicule P 1050; this article also describes the techniques for characterizing porosity, in particular the BET method.

In terms of this invention, "mesoporous layer" refers to a layer that has mesopores. As shall be explained hereinbelow, in these layers, the mesopores contribute significantly to the total porous volume; this state is referred to using the expression "Mesoporous layer with a mesoporous porosity greater than X % by volume" used in the description hereinbelow where X % is preferably greater than 25%, preferably greater than 30% and more preferably comprised between 30 and 50% of the total volume of the layer.

"Aggregate" means, according to the definitions of UPAC a weakly bonded assembly of primary particles. Here, these primary particles are nanoparticles that have a diameter that can be determined by transmission electron microscopy. An aggregate of aggregated primary nanoparticles can normally be destroyed (i.e. reduced to primary nanoparticles) in suspension in a liquid phase under the effect of ultrasound, according to a technique known to those skilled in the art.

"Agglomerate" means, according to the definitions of UPAC a strongly bonded assembly of primary particles or aggregates.

In terms of this invention, the term "electrolyte layer" refers to the layer within an electrochemical device, this device being able to operate according to its destination. For example, in the case where the electrochemical device is a secondary lithium-ion battery, the term "electrolyte layer" refers to the "porous inorganic layer" impregnated with a phase carrying lithium ions.

Said porous inorganic layer in an electrochemical device is here also called "separator", according to the terminology used by those skilled in the art.

According to the invention, the "porous inorganic layer", preferably mesoporous, can be deposited electrophoretically, by dip-coating, by ink-jet, by roll coating, by curtain coating or by doctor blade and this from a suspension of aggregates or agglomerates of nanoparticles, preferably from a concentrate suspension containing agglomerates of nanoparticles.

2. Preparation of Suspensions

The deposition of polydispersed nanoparticles leads to the obtaining of a porous structure that has a closed porosity. Because of this, the use of these polydispersed nanoparticles is to be prohibited from the method according to the invention The method according to the invention uses electrophoresis, ink-jet, doctor blade, roll coating, curtain coating or dip-coating of suspensions of nanoparticles as a deposition technique of these porous, preferably mesoporous, layers. In the framework of the present invention it is preferable to not prepare these suspensions of nanoparticles from dry nanopowders. They can be prepared by grinding of powders or nanopowders in liquid phase.

For example, particles can undergo a wet nanogrinding in ethanol; the particles can be ground with zirconia beads (for example of a diameter of 0.3 mm), for a few hours (for example 5 hours), until a primary particle size greater than or equal to 50 nm, preferably greater than 80 nm, more preferably comprised between 50 nm and 150 nm is obtained; this prevents uncontrolled sintering of the deposited layer, which could lead to the formation of dense layers. The conductivity of the suspension remains low, about 20 μS/cm. It is thus possible to obtain a distribution in size that is unimodal, but that can be rather wide. The disadvantage with nanogrinding is the partial amorphization of the particle in a zone close to the surface, this can hinder the treatment of the layers deposited from these nanoparticles.

In another embodiment of the invention the nanoparticles are prepared in suspension directly by precipitation. The synthesis of nanoparticles by precipitation makes it possible to obtain primary nanoparticles of a very homogenous size with a unimodal size distribution i.e. very tight and monodispersed, with good crystallinity and purity. Using these nanoparticles of a very homogenous size and narrow distribution makes it possible to obtain after deposition a porous structure with a controlled and open porosity. The porous structure obtained after deposition of these nanoparticles has little, preferably no closed pores.

In a more preferred embodiment of the invention the nanoparticles are prepared directly at their primary size by solvothermal or hydrothermal synthesis; this technique makes it possible to obtain nanoparticles with a very narrow and unimodal size distribution; these particles are called "monodispersed nanoparticles" here. Moreover, these particles have very good crystallinity. The size of these non-aggregated or non-agglomerated particles is called their primary size. In the present invention, it is preferably less than 100 nm, advantageously comprised between 10 nm and 50 nm, preferably between 10 nm and 30 nm; this favors during later steps of the method the formation of a porous, preferably mesoporous, interconnected network thanks to the phenomenon of necking.

This suspension of monodispersed nanoparticles can be purified in order to remove all the potentially interfering ions present in the liquid phase. According to the degree of purification it can then be specially treated to form aggregates or agglomerates of a controlled dimension. More precisely, the formation of aggregates or agglomerates results from the destabilization of the suspension caused by ions. If the suspension was entirely purified it is stable, and ions are added in order to destabilize it, typically in the form of a salt; these ions are preferably lithium ions (preferably added in the form of LiOH).

If the suspension was not entirely purified the formation of the aggregates or of the agglomerates can proceed alone spontaneously or via aging. This way of proceeding is simpler because it involves fewer purification steps, but it is more difficult to control the size of the aggregates or of the agglomerates. One of the essential aspects for the manufacture of porous layers according to the invention consists of controlling the size of the primary particles used and their degree of aggregation or agglomeration.

It is this suspension of aggregates or agglomerates of nanoparticles that is then used for deposition by electrophoresis, by ink-jet, by doctor blade, roll coating, by curtain coating or by dip-coating the porous layers according to the invention.

In an embodiment, the material used for the manufacture of porous layers according to the invention is chosen from the inorganic materials with a low melting point, electronic insulator and stable in contact with electrodes during the steps of hot pressing. The more refractory the materials are, the more it will be necessary to heat at the electrode/electrolyte interfaces, at high temperatures thus risking modifying the interfaces with the electrode materials, in particular by interdiffusion, which generates parasite reactions and creates depletion layers of which the electrochemical properties differ from those that are found in the same material at a greater depth from the interface. Materials containing lithium are to be favored as they make it possible to prevent or even eliminate these lithium depletion phenomena.

The material used for the manufacture of porous layers according to the invention is inorganic. In a particular embodiment, the material used for the manufacture of porous inorganic layers according to the invention is an electrically insulating material. It can, preferably be chosen from $Al_2O_3$, $SiO_2$, $ZrO_2$.

Alternatively, the material used for the manufacture of porous inorganic layers according to the invention can be an ion conductor material such as a solid electrolyte comprising lithium so as to limit the modifications to the electrode/electrolyte interfaces.

According to the invention the solid electrolyte material used to manufacture a porous inorganic layer can be chosen in particular from:

- garnets of formula $Li_d A^1_x A2_y(TO_4)_z$ where
  - $A^1$ represents a cation of oxidation state +II, preferably Ca, Mg, Sr, Ba, Fe, Mn, Zn, Y, Gd; and where
  - $A^2$ represents a cation of oxidation state +III, preferably Al, Fe, Cr, Ga, Ti, La; and where
  - ($TO_4$) represents an anion wherein T is an atom of oxidation state +IV, located at the center of a tetrahedron formed by the oxygen atoms, and wherein $TO_4$ advantageously represents the silicate or zirconate anion, knowing that all or a portion of the elements T of an oxidation state +IV can be replaced by atoms of an oxidation state +III or +V, such as Al, Fe, As, V, Nb, In, Ta;
  - knowing that: d is comprised between 2 and 10, preferably between 3 and 9, and more preferably between 4 and 8; x is comprised between 2.6 and 3.4 (preferably between 2.8 and 3.2); y is comprised between 1.7 and 2.3 (preferably between 1.9 and 2.1) and z is comprised between 2.9 and 3.1;
- garnets, preferably chosen from: $Li_7La_3Zr_2O_{12}$; $Li_6La_2BaTa_2O_{12}$; $Li_{5.5}La_3Nb_{1.75}In_{0.25}O_{12}$; $Li_5La_3M_2O_{12}$ with M=Nb or Ta or a mixture of the two compounds; $Li_{7-x}Ba_xLa_{3-x}M_2O_{12}$ with $0 \le x \le 1$ and M=Nb or Ta or a mixture of the two compounds; $Li_{7-x}La_3Zr_{2-x}M_xO_{12}$ with $0 \le x \le 2$ and M=Al, Ga or Ta or a mixture of two or three of these compounds;
- lithium phosphates, preferably chosen from: lithium phosphates of the NaSICON type, $Li_3PO_4$; $LiPO_3$; $Li_3Al_{0.4}Sc_{1.6}(PO_4)_3$ called "LASP"; $Li_{1.2}Zr_{1.9}Ca_{0.1}(PO_4)_3$; $LiZr_2(PO_4)_3$; $Li_{1+3x}Zr_2(P_{1-x}Si_xO_4)_3$ with $1.8<x<2.3$; $Li_{1+6x}Zr_2(P_{1-x}B_xO_4)_3$ with $0 \le x \le 0.25$; $Li_3(Sc_{2x}M_x)(PO_4)_3$ with M=Al or Y and $0 \le x \le 1$; $Li_1+M_x(Sc)_{2x}(PO_4)_3$ with M=Al, Y, Ga or a mixture of the three compounds and $0 \le x \le 0.8$; $Li_{1+x}M_x(Ga_{1-y}Sc_y)_{2-x}(PO_4)_3$ with $0 \le x \le 0.8$; $0 \le y \le 1$ and M=Al or Y or a mixture of the two compounds; $Li_{1+x}M_x(Ga)_{2-x}(PO_4)_3$ with M=Al, Y or a mixture of the two compounds and $0 \le x \le 0.8$; $Li_{1+x}Al_xTi_{2-x}(PO_4)_3$ with $0 \le x \le 1$ called "LATP"; or $Li_{1+x}Al_xGe_{2-x}(PO_4)_3$ with $0 \le x \le 1$ called "LAGP"; or $Li_{1+x+z}M_x(Ge_{1-y}Ti_y)_{2-x}Si_zP_{3-z}O_{12}$ with $0 \le x \le 0.8$ and $0 \le y \le 1.0$ & $0 \le z \le 0.6$ and M=Al, Ga or Y or a mixture of two or three of these compounds; $Li_{3-y}(Sc_{2-x}M_x)Q_yP_{3-y}O_{12}$, with M=Al and/or Y and Q=Si and/or Se, $0<x<0.8$ and $0 \le y \le 1$; or $Li_{1-x-y}M_xSc_{2-x}Q_yP_{3-y}O_{12}$, with M=Al, Y, Ga or a mixture of the three compounds and Q=Si and/or Se, $0 \le x \le 0.8$ and $0 \le y \le 1$; or $Li_{1+x+y+z}M_x(Ga_{1-y}Sc_y)_{2-x}Q_zP_{3-z}O_{12}$ with $0 \le x \le 0.8$; $0 \le y \le 1$; $0 \le z \le 0.6$ with M=Al or Y or a mixture of the two compounds and Q=Si and/or Se; or $Li_{1+x}Zr_{2-x}B_x(PO_4)_3$ with $0 \le x \le 0.25$; or $Li_{1+x}Zr_{2-x}Ca_x(PO_4)_3$ with $0 \le x \le 0.25$; or $Li_{1+x}M^3_xM_{2-x}P_3O_{12}$ with $0 \le x \le 1$ and $M^3$=Cr, V, Ca, B, Mg, Bi and/or Mo, M=Sc, Sn, Zr, Hf, Se or Si, or a mixture of these compounds;
- lithium borates, preferably chosen from: $Li_3(Sc_{2-x}M_x)(BO_3)_3$ with M=Al or Y and $0 \le x \le 1$; $Li_{1+x}M_x(Sc)_{2-x}(BO_3)_3$ with M=Al, Y, Ga or a mixture of the three compounds and $0 \le x \le 0.8$; $Li_{1+x}M_x(Ga_{1-y}Sc_y)_{2-x}(BO_3)_3$ with $0 \le x \le 0.8$, $0 \le y \le 1$ and M=Al or Y; $Li_{1+x}M_x(Ga)_{2-x}(BO_3)_3$ with M=Al, Y or a mixture of the two compounds and $0 \le x \le 0.8$; $Li_3BO_3$, $Li_3BO_3$—$Li_2SO_4$, $Li_3BO_3$—$Li_2SiO_4$, $Li_3BO_3$—$Li_2SiO_4$—$Li_2SO_4$;
- oxinitrides, preferably chosen from $Li_3PO_{4-x}N_{2x/3}$, $Li_4SiO_{4-x}N_{2x/3}$, $Li_4GeO_{4-x}N_{2x/3}$ with $0<x<4$ or $Li_3BO_{3-x}N_{2x/3}$ with $0<x<3$;
- lithium compounds based on lithium oxinitride and phosphorus, called "LiPON", in the form $Li_xPO_yN_z$ with x ~2.8 and 2y+3z~7.8 and $0.16 \le z \le 0.4$, and in particular $Li_{2.9}PO_{3.3}N_{0.46}$, but also the compounds $Li_wPO_xN_yS_Z$ with 2x+3y+2z=5=w or the compounds $Li_wPO_xN_yS_Z$ with $3.2 \le x<3.8$, $0.13 \le y \le 0.4$, $0 \le z \le 0.2$, $2.9 \le w \le 3.3$ or the compounds in the form of $Li_tP_xAl_yO_uN_vS$, with 5x+3y=5, 2u+3v+2w=5+t, $2.9 \le t \le 3.3$, $0.84 \le x \le 0.94$, $0.094 \le y \le 0.26$, $3.2 \le u \le 3.8$, 0.13 $v \le 0.46$, $0 \le w \le 0.2$;
- materials based on lithium phosphorus or boron oxinitrides, respectively called "LiPON" and "LIBON", that may also contain silicon, sulfur, zirconium, aluminum, or a combination of aluminum, boron, sulfur and/or silicon, and boron for the materials based on lithium phosphorus oxinitrides;
- lithium compounds based on lithium, phosphorus and silicon oxinitride called "LiSiPON", and particularly $Li_{1.9}Si_{0.23}P_{1.0}O_{1.1}N_{1.0}$;
- lithium oxinitrides of the LiBON, LiBSO, LiSiPON, LiSON, thio-LiSiCON, LiPONB types (where B, P and S represent boron, phosphorus and sulfur respectively);
- lithium oxinitrides of the LiBSO type such as (1-x) $LiBO_2$-x$Li_2SO_4$ with $0.4 \le x \le 0.8$;
- lithium oxides, preferably chosen from $Li_7La_3Zr_2O_{12}$ or $Li_{5-x}La_3(Zr_x,A_{2-x})O_{12}$ with A=Sc, Y, Al, Ga and $1.4 \le x \le 2$ or $Li_{0.35}La_{0.55}TiO_3$ or $Li3xLa_{2/3-x}TiO_3$ with $0 \le x \le 0.16$ (LLTO);
- silicates, preferably chosen from $Li_2Si_2O_5$, $Li_2SiO_3$, $Li_2Si_2O_6$, $LiAlSiO_4$, $Li_4SiO_4$, $LiAlSi_2O_6$;
- solid electrolytes of the anti-perovskite type chosen from: $Li_3OA$ with A a halide or a mixture of halides, preferably at least one of the elements chosen from F, Cl, Br, I or a mixture of two or three or four of these elements; $Li_{(3-x)}M_{x/2}OA$ with $0<x \le 3$, M a divalent metal, preferably at least one of the elements Mg, Ca, Ba, Sr or a mixture of two or three or four of these elements, A a halide or a mixture of halides, preferably at least one of the elements F, Cl, Br, I or a mixture of two or three or four of these elements; $Li_{(3-x)}M^3_{x/3}OA$ with $0 \le x \le 3$, $M^3$ a trivalent metal, A a halide or a mixture of halides, preferably at least one of the elements F, Cl, Br, I or a mixture of two or three or four of these elements; or $LiCOX_zY_{(1-z)}$, with X and Y halides such as mentioned hereinabove in relation with A, and $0 \le z \le 1$,
- the compounds $La_{0.51}Li_{0.34}Ti_{2.94}$, $Li_{3.4}V_{0.4}Ge_{0.6}O_4$, $Li_2O$—$Nb_2O_5$, $LiAlGaSPO_4$;
- formulations based on $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$(where M=Ge, Ti, and/or Hf, and where $0<x<1$), $Li_{1+x+y}Al_xTi_{2-x}Si_yP_{3-y}O_{12}$ (where $0 \le x \le 1$ and $0 \le y \le 1$).

For the carrying out of the assemblies of the batteries, the presence of a porous layer of solid electrolytes with a base of the lithium phosphates between the anodes and cathodes is preferred. These materials have relatively low melting points, and the particles fuse relatively well at moderate temperatures. Moreover, the fact that they already contain inserted lithium makes it possible to prevent lithium from diffusing in the material during the assembly, which could create depletion zones on the surface.

According to the observations of the applicant, with an average diameter of aggregates or agglomerates of nanoparticles comprised between 80 nm and 300 nm (preferably between 100 nm to 200 nm) during later method steps, a layer with an open porosity, with an average diameter of pores less than 100 nm, preferable less than 80 nm, preferably comprised between 2 nm and 80 nm, and more preferably comprised between 2 nm and 50 nm.

According to the invention, the porous inorganic layer can be deposited electrophoretically, by ink-jet, by doctor blade, roll coating, by curtain coating or by dip-coating.

3. Deposition of a Porous Inorganic Layer by Electrophoresis

The method according to the invention can use the electrophoresis of suspensions of nanoparticles as a deposition technique of porous layers. The method of deposition of layers from a suspension of nanoparticles is known as such (see for example EP 2 774 208 B1). Deposition by electrophoresis is done by application of an electric field between the substrate on which the deposit is made and a counter electrode, in order to move the charged particles in the colloidal suspension and to deposit them on the substrate. In order to ensure the stability of the colloidal suspension, polar nanoparticles are preferably used, and/or the colloidal suspension advantageously has a Zeta potential with an absolute value greater than 25 mV.

Deposition by electrophoresis is done from a suspension of particles of inorganic material able to be used as an porous inorganic layer according to the invention, on a substrate that has sufficient electrical conductivity. Thus, this can be a metallic substrate, for example a metal foil (such as a stainless steel foil with a thickness of about 5 μm), or a polymeric or non-metallic foil provided with a conductive surface (for example coated with a layer of metal or with a layer of conductive oxide, such as a layer of ITO, which has the advantage of also acting as a diffusion barrier). To manufacture a battery, inorganic material can be deposited by electrophoresis on a layer of electrode material (anode or cathode). Said layer of electrode material can have been deposited for example on a conductive substrate of the metal foil or polymeric foil type coated with a conductive layer. So that the electrophoresis can take place, a counter electrode is placed in the suspension and a voltage is applied between the substrate and said counter electrode. The electrophoretic deposition rate depends on the applied electric field and the electrophoretic mobility of particles in suspension and can be very high. For an applied voltage of 200 V, the deposition rate can reach about 10 μm/min.

The inventor has observed that this technique makes it possible to deposit very homogenous layers on very large areas (subject to the concentrations in particles and electric fields being homogeneous over the surface of the substrate). It is also suitable for a continuous band process, as well as for a batch process on plates.

The porous, preferably mesoporous, inorganic layer, is deposited on an anode 12 and/or cathode 22 layer, themselves formed on a conductive substrate used as a current collector by an appropriate process, and/or directly on a sufficiently conductive substrate used as a current collector.

This substrate used as a current collector can be metallic, for example a metal foil, or a polymeric foil or metalized non-metallic (i.e. coated with a layer of metal). The substrate is preferably chosen from foils made from titanium, copper, nickel or stainless steel.

The metal foil can be coated with a layer of noble metal, in particular chosen from gold, platinum, titanium or alloys containing mostly at least one or more of these metals, or with a layer of conductive material of the ITO type (which has the advantage of also acting as a diffusion barrier).

In batteries that use porous electrodes and porous inorganic layers according to the invention, the liquid phases carrying lithium ions that impregnate the pores are in direct contact with the current collector. However, when these liquid phases carrying lithium ions are in contact with the metal substrates and polarized at potentials that are highly anodic for the cathode and highly cathodic for the anode, these liquid phases carrying lithium ions are able to induce a dissolution of the current collector. These parasite reactions can degrade the service life of the battery and accelerate the self-discharging thereof. In order to prevent this, aluminum current collectors are used at the cathode, in all lithium-ion batteries. Aluminum has this particularity of anodizing at highly anodic potentials, and the oxide layer thus formed on the surface thereof protects it from dissolution. However, aluminum has a melting temperature close to 600° C. and cannot be used for the manufacture of batteries comprising porous electrodes and an electrolyte according to the invention. The later consolidation treatments of porous electrodes and of electrolytes according to the invention would lead to melting the current collector. Thus, to prevent the parasite reactions that can degrade the service life of the battery and accelerate the self-discharging thereof, a foil made of titanium is advantageously used as a current collector at the cathode. During the operation of the battery, the foil made of titanium will, like aluminum, anodize and its oxide layer will prevent any parasite reactions of dissolution of the titanium in contact with the liquid electrolyte. In addition, as titanium has a melting point that is much higher than aluminum, all-solid-state electrodes according to the invention, can be made directly on this type of foil.

Using these massive materials, in particular foils made of titanium, copper or nickel, also makes it possible to protect the cut edges of the electrodes of batteries from corrosion phenomena.

Stainless steel can also be used as a current collector, in particular when it contains titanium or aluminum as alloy element, or when it has on the surface a thin layer of protective oxide.

Other substrates used as a current collector can be used such as less noble metal foils covered with a protective coating, making it possible to prevent any dissolution of these foils induced by the presence of electrolytes in contact with them.

These less noble metal foils can be foils made of Copper, Nickel or foils of metal alloys such as foils made of stainless steel, foils of Fe—Ni alloy, Be—Ni—Cr alloy, Ni—Cr alloy or Ni—Ti alloy.

The coating that can be used to protect the substrates used as current collectors can be of different natures. It can be a:

- thin layer obtained by sol-gel process of the same material as that of the electrode. The absence of porosity in this film makes it possible to prevent contact between the electrolyte and the metal current collector,
- thin layer obtained by vacuum deposition, in particular by physical vapor deposition (PVD) or by chemical vapor deposition (CVD), of the same material as that of the electrode,
- thin metal layer, dense, without defects, such as a thin metal layer of gold, titanium, platinum, palladium, tungsten or molybdenum. These metals can be used to protect the current collectors because they have good conduction properties and can resist heat treatments during the subsequent method of manufacturing electrodes. This layer can in particular be done by electrochemistry, PVD, CVD, evaporation, ALD.
- thin layer of carbon such as diamond-like carbon, graphite, deposited by ALD, PVD, CVD or by inking of a sol-gel solution making it possible to obtain after heat treatment a carbon-doped inorganic phase to make it conductive, or a layer of conductive oxides, such as a layer of ITO (indium tin oxide) only deposited on the cathode substrate because the oxides are reduced at low potentials, layer of conducting nitrides, such as a layer of TiN only deposited on the cathode substrate because the nitrides insert the lithium at low potentials.

The coating that can be used to protect the substrates used as current collectors must be electronically conductive in order not to harm the operation of the electrode deposited later on this coating, by making it too resistive.

Generally, in order to not excessively impact the operation of the battery cells, the maximum dissolution currents measured on the substrates, at the operating potentials of the electrodes, expressed in $\mu A/cm^2$, must be 1000 times less than the surface capacities of the electrodes expressed in $\mu Ah/cm^2$.

The porous, preferably mesoporous, inorganic layer, is deposited on an anode layer 12 and/or a cathode layer 22. Electrophoretic deposition of a layer of material allows for perfect coverage of the electrode layer surface regardless of its geometry and the presence of roughness defects. Consequently, it can guarantee dielectric properties of the layer. In an advantageous embodiment, high-frequency current pulses are applied, because this prevents the formation of bubbles at the surface of the electrodes and the variations in the electric field in the suspension during the deposition. The thickness of the porous inorganic layer thus deposited is advantageously less than 10 μm, preferably less than 8 μm, and is more preferably between 1 μm and 6 μm.

The compactness of the layer obtained by electrophoretic deposition, and the lack of any large quantities of organic compounds in the layer can limit or even prevent risks of crazing or the appearance of other defects in the layer during drying steps. According to an essential characteristic of the present invention the porous inorganic layer according to the invention is organic binder-free.

4. Deposition of a Porous Inorganic Layer by Dip-Coating

It is possible to deposit nanoparticles of an inorganic material by the dip-coating method and this, regardless of the chemical nature of the nanoparticles used. This deposition method is preferred when the inorganic nanoparticles are little or not at all electrically charged. In order to obtain a layer of desired thickness, the step of deposition by dip-coating inorganic nanoparticles followed by the step of drying of the layer obtained are repeated as much as necessary.

Although this succession of coating steps by dipping/drying is time consuming, the method of deposition by dip-coating is a simple, safe, easy to implement and industrialize method, and it makes it possible to obtain a homogenous and compact final layer.

These nanoparticles are deposited on an anode 12 and/or cathode 22 layer, themselves formed on a conductive substrate used as a current collector by an appropriate process, and/or directly on a sufficiently conductive substrate used as a current collector as indicated in the preceding section 3.

5. Treatment and Properties of the Deposited Layers

After their deposition the layers must be dried; drying must not induce the formation of cracks. For this reason it is preferred to carry it out in controlled humidity and temperature conditions.

Figure 1B:
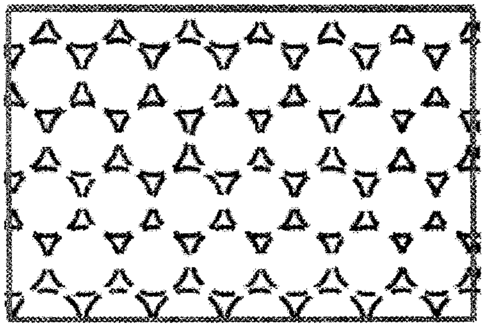

The dried layers can be consolidated by a step of pressing and/or heat treatment. In a very advantageous embodiment of the invention this mechanical (i.e. mechanical compression) and/or heat treatment leads to a partial coalescence of the primary nanoparticles in the aggregates, or the agglomerates, and between neighboring aggregates or agglomerates; this phenomenon is called "necking" or "neck formation". It is characterized by the partial coalescence of two particles in contact, which remain separated by connected by a neck (shrinkage); this is shown diagrammatically in FIG. 1. A three-dimensional network of interconnected particles is thus formed, this network includes an open porosity formed by interconnected pores. The size of these pores is advantageously within the range of mesopores, i.e. between 2 nm and 50 nm. Advantageously, the open pores of said porous inorganic layer have a volume greater than 25%, preferably greater than 30% of the total volume of said porous inorganic layer. When the volume of the pores of the porous inorganic layer is less than 25%, a three-dimensional network of interconnected particles cannot be obtained; the layer obtained in this case has a closed porosity that does not allow the structure to be impregnated later with a phase carrying lithium ions.

The temperature required to obtain "necking" depends on the material; in light of the diffusive nature of the phenomenon that leads to necking the duration of the treatment depends on the temperature.

According to the case, this heat treatment, if it is carried out at a sufficient temperature, for example 350° C., also makes it possible to eliminate any organic residue coming from the method of manufacturing of the suspension of nanoparticles or solvents.

The heat treatment and/or the pressing is advantageously carried out during later steps of manufacturing used for other purposes; this is described in section 6 hereinbelow with respect to the manufacturing of batteries.

6. Assembly of a Battery

One of the purposes of the invention is to supply new thin-layer electrolytes for secondary lithium-ion batteries. Here, the carrying out of a battery with an electrolyte comprising a porous inorganic layer is described.

A suspension of nanoparticles of a precursor material of a porous inorganic layer can be prepared solvothermally, in particular hydrothermally, which directly leads to nanoparticles with good crystallinity. The porous organic layer is deposited electrophoretically, by ink-jet, by doctor blade, by roll coating, by curtain coating or by dip coating on a cathode layer 22 covering a substrate 21 and/or on an anode layer 12 covering a substrate 11; in both cases said substrate 11, 21 has to have conductivity that is sufficient to be able to act as a cathodic or anodic current collector, respectively.

The assembly of the cell formed by an anode layer, the porous inorganic layer and a cathode layer is done by hot pressing, preferably in an inert atmosphere. The temperature is advantageously comprised between 300° C. and 500° C., preferably between 350° C. and 450° C. The pressure is advantageously comprised between 40 MPa and 100 MPa. The hot pressing can be carried out for example at 350° C. and 100 MPa.

Then, this cell, which is entirely solid and rigid, and which does not contain any organic material, is impregnated by immersion in a phase carrying lithium ions. Due to the open porosity of the small size of the porosities (in particular when the size $D_{50}$ of the pores is less than 50 nm), the impregnation in the entire cell (electrodes and separator) is done via capillarity. A particularly preferred separator is a separator made from $Li_3Al_{0.4}Sc_{1.6}(PO_4)_3$ that has a mesoporosity. Details on the impregnation are given in section 7 hereinbelow.

The phase carrying lithium ions can contain for example $LiPF_6$ or $LiBF_4$ dissolved in an aprotic solvent, or an ionic liquid containing lithium salts. Ionic liquids can also be used, possibly dissolved in a suitable solvent, and/or mixed with organic electrolytes. It is possible for example to mix at 50% by weight $LiPF_6$ dissolved in EC/DMC with an ionic liquid containing lithium salts of the type LiTFSI: PYR14TFSI (molar ratio 1:9). Mixtures of ionic liquids can also be made that can operate at low temperature such as for example the mixture LiTFSI:PYR13FSI:PYR14TFSI (molar ratio 2:9:9).

EC is the common abbreviation of ethylene carbonate (CAS no.: 96-49-1). DMC is the common abbreviation of dimethyl carbonate (CAS no.: 616-38-6). LITFSI is the common abbreviation of lithium bis-trifluoromethanesulfonimide (CAS no.: 90076-65-6). PYR13FSI is the common abbreviation of N-Propyl-N-Methylpyrrolidinium bis(fluorosulfonyl) imide. PYR14TFSI is the common abbreviation of 1-butyl-1-methylpyrrolidinium bis(trifluoro-methanesulfonyl)imide.

We describe here another example of manufacturing a lithium-ion battery according to the invention. This method comprises the steps of:

(1) Providing at least two conductive substrates covered beforehand with a layer of material that can be used as an anode and, respectively, as a cathode (these layers being called "anode layer" and "cathode layer"), (2) Providing a colloidal suspension, containing aggregates or agglomerates of nanoparticles of at least one inorganic material, said aggregates or said agglomerates having an average diameter Do comprised between 80 nm and 300 nm (preferably between 100 nm to 200 nm), (3) Deposition of a porous inorganic layer by electrophoresis, by ink-jet, by doctor blade, by roll coating, by curtain coating or by dip-coating, from said colloidal suspension on at least one cathode or anode layer obtained in step (1), (4) Drying the layer thus obtained, preferably in an airflow, (5) Stacking of layers of cathode and anode, preferably offset laterally, (6) Treating the stack of anode and cathode layers obtained in step (5) by mechanical compression and/or heat treatment so as to juxtapose and assemble the porous inorganic layers present on the anode and cathode layers.

(7) Impregnating of the structure obtained in step (6) by an electrolytic solution such as an ionic liquid containing lithium salts, a phase carrying lithium ions, preferably with a phase carrying lithium ions comprising at least 50% by weight of at least one ionic liquid, to obtain a battery.

The order of steps (1) and (2) is not important.

The battery obtained is entirely rigid, and this even when at least one ionic liquid is used, the latter being nanoconfined in the pores of the porous layers.

The average primary diameter $D_{50}$ of the nanoparticles forming the aggregates or agglomerates of said suspension can be less than or equal to 50 nm, and in this case this suspension is prepared by precipitation or by solvothermal synthesis. It can also be greater than 50 nm, preferably comprised between 50 nm and 150 nm and in this case suspensions obtained by wet grinding can be used.

Advantageously, the anode and cathode layers can be dense electrodes, i.e. electrodes that have a volume porosity less than 20%, porous electrodes, preferably having an interconnected network of open pores or mesoporous electrodes, preferably having an interconnected network of open mesopores.

Due to the very large specific surface area of the porous, preferably mesoporous electrodes, during the use thereof with a liquid electrolyte parasite reactions can occur between the electrodes and the electrolyte; these reactions are at least partially irreversible. In an advantageous embodiment a very thin layer of an electronically insulating material, that is preferably an ionic conductor, is applied on the porous, preferably mesoporous, electrode layer, so as to block these parasite reactions.

In the framework of dense electrodes and in another advantageous embodiment a very thin layer of an electronically insulating material, which is preferably ion conducting, is applied on the electrode layer so as to reduce the interfacial resistance that exists between the dense electrode and the electrolyte.

This layer of electronically insulating material, which is preferably ion conducting, advantageously has an electronic conductivity less than $10^{-8}$ S/cm. Advantageously this deposition is carried out at least on one face of the electrode, whether it is porous or dense, that forms the interface between the electrode and the electrolyte. This layer can for example by made of alumina, silica, or zirconia. $Li_4Ti_5O_{12}$ can be used on the cathode or another material that, like $Li_4Ti_5O_{12}$, has the characteristic of not inserting, at the operating voltages of the cathode, lithium, and of behaving as an electronic insulator.

Alternatively this layer of an electronically insulating material can be an ionic conductor, which advantageously has an electronic conductivity less than $10^{-8}$ S/cm. This material has to be chosen in such a way as to not insert, at the operating voltages of the battery, lithium but only to transport it. For this can be used for example $Li_3PO_4$, $Li_3BO_3$, lithium lanthanum zirconium oxide (called LLZO), such as $Li_7La_3Zr_2O_{12}$, that have a wide range of operating potential. On the other hand, lithium lanthanum titanium oxide (abbreviated LLTO), such as $Li_{3x}La_{2/3-x}TiO_3$, lithium aluminum titanium phosphate (abbreviated LATP), lithium aluminum germanium phosphate (abbreviated LAGP), can be used only in contact with cathodes because their range of operating potential is limited; beyond this range they are able to insert the lithium into their crystallographic structure.

This deposition further improves the performance of lithium-ion batteries including at least one electrode, whether it is porous or dense. In the case of impregnated porous electrodes, this deposition makes it possible to reduce the interface faradic reactions with the electrolytes. These parasite reactions are all the more so important when the temperature is high; they are at the origin of reversible and/or irreversible losses in capacity. In the case of dense electrodes in contact with the electrolyte, it also makes it possible to limit the interface resistance linked to the appearance of space charges.

Very advantageously this deposition is carried out by a technique allowing for a covering coating (also called conformal deposition), i.e. a deposition that faithfully reproduces the atomic topography of the substrate on which it is applied. The ALD (Atomic Layer Deposition) or CSD (Chemical Solution Deposition) technique, known as such, can be suitable. It can be implemented on dense electrodes before the deposition of the porous inorganic layer and before the assembly of the cell. It can be implemented on the porous, preferably mesoporous, electrodes after manufacture, before and/or after the deposition of the porous inorganic layer and before and/or after the assembly of the cell, preferably before the impregnation of the porous electrodes with a phase carrying lithium ions.

The deposition technique by ALD is done layer by layer, by a cyclic method, and makes it possible to carry out an encapsulating coating that truly reproduces the topography of the substrate; it lines the entire surface of the electrodes. This covering coating typically has a thickness comprised between 1 nm and 5 nm. The deposition technique by CSD makes it possible to carry out an encapsulating coating that truly reproduces the topography of the substrate; it lines the entire surface of the electrodes. This covering coating typically has a thickness less than 5 nm, preferably comprised between 1 nm and 5 nm.

When the electrodes used are porous and covered with a nanolayer of an electronically insulating material, preferably ion conducting, it is preferable that the primary diameter $D_5O$ of the particles of electrode material used to create them be at least 10 nm in order to prevent the layer of electronically insulating material, preferably ion conducting, from clogging the open porosity of the electrode layer.

The layer of an electronically insulating material, preferably ion conducting, must be deposited only on electrodes that do not contain any organic binder. Indeed, deposition by ALD is carried out at a temperature typically comprised between 100° C. and 300° C. At this temperature the organic materials that form the binder (for example the polymers contained in the electrodes made by tape casting of ink) risk decomposing and will pollute the ALD reactor. Moreover, the presence of residual polymers in contact with particles of active electrode material can prevent the ALD coating from covering the entire surface of the particles, which is detrimental to its effectiveness.

For example, a layer of alumina of a thickness of about 1.6 nm can be suitable.

If the electrode is a cathode it can be made from a cathode material P chosen from:

- oxides $LiMn_2O_4$, $Li_{1+x}Mn_{2-x}O_4$ with $0<x<0.15$, $LiCoO_2$, $LiNiO_2$, $LiMn_{1.5}Ni_{0.5}O_4$, $LiMn_{1.5}Ni_{0.5-x}X_xO_4$ where X is selected from Al, Fe, Cr, Co, Rh, Nd, other rare earths such as Sc, Y, Lu, La, Ce, Pr, Pm, Sm, Eu, Gd, Tb, Dy, Ho, Er, Tm, Yb, and where $0<x<0.1$, $LiMn_{2-x}M_xO_4$ with M=Er, Dy, Gd, Tb, Yb, Al, Y, Ni, Co, Ti, Sn, As, Mg or a mixture of these compounds and where $0<x<0.4$, $LiFeO_2$, $LiMn_{1/3}Ni_{1/3}Co_{1/3}O_2$, $LiNi_{0.8}Co_{0.15}Al_{0.05}O_2$, $LiAl_xMn_{2-x}O_4$ with $0\leq x<0.15$, $LiNi_{1/x}Co_{1/y}Mn_{1/z}O_2$ with x+y+z=10;
- phosphates $LiFePO_4$, $LiMnPO_4$, $LiCoPO_4$, $LiNiPO_4$, $Li_3V_2(PO_4)_3$; phosphates of formula LiMM'PO$_4$, with M and M' (M≠M') selected from Fe, Mn, Ni, Co, V;
- all lithium forms of the following chalcogenides: $V_2O_5$, $V_3O_8$, $TiS_2$, titanium oxysulfides ($TiO_yS_z$ with z=2−y and $0.3\leq y\leq 1$), tungsten oxysulfides ($WO_yS_z$ with $0.6<y<3$ and $0.1<z<2$), CuS, $CuS_2$, preferably $Li_xV_2O_5$ with $0<x\leq 2$, $LiV_3O_8$ with $0<x\leq 1.7$, $Li_xTiS_2$ with $0<x\leq 1$, titanium oxysulfides and lithium oxysulfides $Li_xTiO_yS_z$ with z=2−y, $0.3\leq y\leq 1$, $Li_xWO_yS_z$, $Li_xCuS$, $Li_xCuS_2$.

If the electrode is an anode it can be made from an anode material P chosen from:

- carbon nanotubes, graphene, graphite;
- lithium iron phosphate (of typical formula $LiFePO_4$);
- silicon and tin oxinitrides (of typical formula $Si_aSn_bO_yN_z$ with a>0, b>0, a+b<2, $0<y\leq 4$, $0<z\leq 3$) (also called SiTON), and in particular $SiSn_{0.87}O_{1.2}N_{1.72}$; as well as the oxynitride-carbides of typical formula $Si_aSn_bC_cO_yN_z$ with a>0, b>0, $a+b\leq 2$, 0<c<10, 0<y<24, 0<z<17;
- nitrides of the type $Si_xN_y$ (in particular with x=3 and y=4), $Sn_xN_y$ (in particular with x=3 and y=4), $Zn_xN_y$ (in particular with x=3 and y=2), $Li_{3-x}M_xN$ (with $0\leq x\leq 0.5$ for M=Co, $0\leq x\leq 0.6$ for M=Ni, $0\leq x\leq 0.3$ for M=Cu); $Si_{3-x}M_xN_4$ with M=Co or Fe and $0\leq x\leq 3$.
- oxides $SnO_2$, SnO, $Li_2SnO_3$, $SnSiO_3$, $Li_xSiO_y$ (x>=0 and 2>y>0), $Li_4Ti_5O_{12}$, $TiNb_2O_7$, $Co_3O_4$, $SnB_{0.6}P_{0.4}O_{2.9}$ and $TiO_2$,
- composite oxides $TiNb_2O_7$ comprising between 0% and 10% carbon by weight, preferably carbon being chosen from graphene and the carbon nanotubes.

On dense, porous, preferably mesoporous electrodes, coated or not with an electronically insulating material, preferably ion conducting by ALD or chemically in solution known under the acronym CSD, an electrolyte according to the invention can be carried out.

In order to obtain a battery with high energy density and with high power density, this battery advantageously contains a porous, preferably mesoporous, anode layer and cathode layer, and an electrolyte according to the invention.

Advantageously, the anode and cathode layers, coated or not with a layer by ALD of an electronically insulating material, preferably ion conducting, then covered with a porous inorganic layer are hot pressed in order to favor the assembly of the cell without inducing sintering. The deposits remain porous and can be impregnated later by an electrolytic solution by preventing any risk of later short-circuiting.

Advantageously, a battery comprising at least one porous, preferably mesoporous, electrode and an electrolyte according to the invention has increased performance, in particular a high power density An example of manufacturing a lithium-ion battery according to the invention comprising at least one porous, preferably mesoporous electrode, is described hereinbelow. This method comprises the steps of:

(1) A colloidal suspension is provided including nanoparticles of at least one cathode material with a primary diameter Do less than or equal to 50 nm;

(2) A colloidal suspension is provided including nanoparticles of at least one anode material with an average primary diameter Do less than or equal to 50 nm;

(3) Providing of at least two flat conductive substrates, preferably metal, said conductive substrates can be used as current collectors of the battery, (4) Deposition of at least one thin cathode, respectively anode, layer, preferably by dip-coating, by ink-jet, by doctor blade, by roll coating, by curtain coating or by electrophoresis, preferably by pulsed-current galvanostatic electrodeposition, from said suspension of nanoparticles of material obtained in step (1), respectively in step (2), on said substrate obtained in step (3), (5) Drying the layer thus obtained in step (4), (6) Optionally, deposition by ALD of a layer of electronically insulating material on the surface of the cathode layer, and/or anode layer obtained in step (5), (7) Deposition by electrophoresis, by ink-jet, by doctor blade, by roll coating, by curtain coating or by dip-coating of a porous inorganic layer from a colloidal suspension comprising aggregates or agglomerates of nanoparticles of at least one inorganic material, on the cathode and/or anode layer obtained in step 5) or in step 6), to obtain and first and/or a second intermediate structure, (8) Drying of the layer thus obtained in step (7), preferably in an air flow, (9) Creating a stack from said first and/or second intermediate structure to obtain a stack of the "substrate/anode/porous inorganic layer/cathode/substrate" type: either by depositing an anode layer on said first intermediate structure, or by depositing a cathode layer on said second intermediate structure, or by superposing said first intermediate structure and said second intermediate structure in such a way that the two layers of porous inorganic layers are placed one on top of the other,

(10) Hot pressing of the stack obtained in step (9),

(11) Impregnating of the structure obtained in step (10) or in step (11) with a phase carrying lithium ions leading to the obtaining of an impregnated structure, preferably a cell.

The order of steps (1), (2) and (3) is not important.

Advantageously, said aggregates or agglomerates of nanoparticles of at least one inorganic material have an average diameter comprised between 80 nm and 300 nm, preferably between 100 nm and 200 nm, Once the assembly of a stack forming a battery by hot pressing is completed, it can be impregnated with a phase carrying lithium ions. This phase can be a solution formed by a lithium salt dissolved in an organic solvent or a mixture of organic solvents, and/or dissolved in a polymer containing at least one lithium salt, and/or dissolved in an ionic liquid (i.e. a melted lithium salt) containing at least one lithium salt. This phase can also be a solution formed from a mixture of these components. The porous, preferably mesoporous, electrodes are able to absorb a liquid phase by simple capillarity when the average diameter $D_{50}$ of the pores is between 2 nm and 80 nm, preferably between 2 nm and 50 nm, preferably between 6 nm and 30 nm, preferably between 8 nm and 20 nm. This entirely unexpected effect is particularly favored with the decrease in the diameter of the pores of these electrodes.

Advantageously, the porous, preferably mesoporous, electrodes are impregnated by an electrolyte, preferably a phase carrying lithium ions such as an ionic liquid containing lithium salts, possibly diluted in an organic solvent or a mixture of organic solvents containing a lithium salt that can be different from the one dissolved in the ionic liquid.

A lithium-ion battery cell with very high power density is thus obtained.

7. Impregnation of Porous Inorganic Layers

As indicated in the preceding section, once the deposition of a porous inorganic layer and the treatment thereof, for example during the assembly of a stack forming a battery by hot pressing, is completed, it can be impregnated with a phase carrying lithium ions. This phase can be a solution formed by a lithium salt dissolved in an organic solvent or a mixture of organic solvents, and/or dissolved in a polymer containing at least one lithium salt, and/or dissolved in an ionic liquid (i.e. a melted lithium salt) containing at least one lithium salt. This phase can also be a solution formed from a mixture of these components.

The inventors have found that the porous inorganic layers according to the invention are able to absorb a liquid phase by simple capillarity. This entirely unexpected effect is specific to the depositions of porous inorganic layers according to the invention; it is particularly favored when the average diameter Do of the mesopores is between 2 nm and 80 nm, preferably between 2 nm and 50 nm, preferably between 6 nm and 30 nm, and more preferably between 8 nm and 20 nm.

In an advantageous embodiment of the invention, the porous inorganic layer has a porosity, and preferably a mesoporous porosity, greater than 30%, pores of an average diameter Do less than 50 nm, and a primary diameter of particles less than 30 nm. Its thickness is advantageously less than 10 μm, preferably comprised between 3 μm and 6 μm, and preferably comprised between 2.5 μm and 4.5 μm, so as to reduce the final thickness of the battery without reducing its properties. It is binder-free. Its pores are impregnated by an electrolytic solution such as an ionic liquid containing lithium salts, possibly diluted in an organic solvent or a mixture of organic solvents containing a lithium salt that can be different from the one dissolved in the ionic liquid.

In one particularly advantageous embodiment the porosity, preferably mesoporous, is comprised between 35% and 50%, and more preferably between 40% and 50%.

The "nanoconfined" or "nanotrapped" liquid in the porosities, and in particular in the mesoporosities, can no longer exit. It is linked by a phenomenon here called "absorption in the mesoporous structure" (which does not seem to have been described in the literature in the context of lithium-ion batteries) and it can no longer exit even when the cell is placed in a vacuum. The battery is then considered as quasi-solid.

The phase carrying lithium ions, can be an ionic liquid containing lithium salts, possibly diluted with an organic solvent or a mixture of organic solvents containing a lithium salt that can be different from the one dissolved in the ionic liquid.

The ionic liquid is formed from a cation associated with an anion; this anion and this cation are chosen in such a way that the ionic liquid is in the liquid state in the operating temperature range of the accumulator. The ionic liquid has the advantage of having a high thermal stability, a reduced flammability, of being non-volatile, of being little toxic and a good wettability of ceramics, which are materials that can be used as electrode materials. Surprisingly, the percentage by weight of ionic liquid contained in the phase carrying lithium ions can be greater than 50%, preferably greater than 60% and more preferably greater than 70%, and this contrary to the lithium-ion batteries of the prior art where the percentage by weight of ionic liquid in the electrolyte must be less than 50% by weight in order for the battery to retain a capacity and a voltage that are high in discharge as well as to present a good stability in cycling. Beyond 50% by weight the capacity of the battery of the prior art degrades, as indicated in application US 2010/209 783 A1. This can be explained by the presence of polymer binders within the electrolyte of the battery of the prior art; these binders are poorly wetted by the ionic liquid inducing a poor ion conduction within the phase carrying lithium ions thus causing a degradation in the capacity of the battery.

The batteries using a porous electrode according to the invention are, preferably, binder-free. Because of this, these batteries can use a phase carrying lithium ions comprising more than 50% by weight of at least one ionic liquid without degrading the final capacity of the battery.

The phase carrying lithium ions can comprise a mixture of several ionic liquids.

Advantageously, the ionic liquid can be a cation of the type 1-Ethyl-3-methylimidazolium (also called EMI+) and/or n-propyl-n-methylpyrrolidinium (also called $PYR_{13}$*) and/or n-butyl-n-methylpyrrolidinium (also called $PYR_{14}$*), associated with anions of the type bis (trifluoromethanesulfonyl)imide ($TFSI^-$) and/or bis(fluorosulfonyl)imide ($FSI^-$). To form an electrolyte, a lithium salt such as LiTFSI can be dissolved in the ionic liquid which is used as a solvent or in a solvent such as γ-butyrolactone. γ-butyrolactone prevents the crystallization of the ionic liquids inducing an operating range in temperature of the latter that is greater, in particular at low temperature.

The phase carrying lithium ions can be an electrolytic solution comprising PYR14TFSI and LiTFSI; these abbreviations will be defined hereinbelow.

Advantageously, when the porous anode or cathode comprises a lithium phosphate surface protective film, the phase carrying lithium ions can comprise a solid electrolyte such as $LiBH_4$ or a mixture of $LiBH_4$ with one or more compounds chosen from LiCl, LiI and LiBr. $LiBH_4$ is a good conductor of lithium and has a low melting point that facilitates the impregnation thereof in the porous electrodes, in particular by dipping. Due to is extremely reducing properties, $LiBH_4$ is little used as an electrolyte. Using a protective film on the surface of porous lithium phosphate electrodes prevents the reduction in electrode materials, in particular cathode materials, by $LiBH_4$ and prevents degradation of the electrodes.

Advantageously, the phase carrying lithium ions comprises a least one ionic liquid, preferably at least one ionic liquid at ambient temperature, such as PYR14TFSI, possibly diluted in at least one solvent, such as γ-butyrolactone.

Advantageously, the phase carrying lithium ions comprises between 10% and 40% by weight of a solvent, preferably between 30 and 40% by weight of a solvent, and more preferably between 30 and 40% by weight of γ-butyrolactone.

Advantageously the phase carrying lithium ions comprises more than 50% by weight of at least one ionic liquid and less than 50% solvent, which limits the risks of safety and of ignition in case of malfunction of the batteries comprising such a phase carrying lithium ions.

Advantageously, the phase carrying lithium ions comprises:

- between 30 and 40% by weight of a solvent, preferably between 30 and 40% by weight of γ-butyrolactone, and
- more than 50% by weight of at least one ionic liquid, preferably more than 50% by weight of PYR14TFSI.

The phase carrying lithium ions can be an electrolytic solution comprising PYR14TFSI, LiTFSI and γ-butyrolactone, preferably an electrolytic solution comprising about 90% by weight of PYR14TFSI, 0.7 M of LiTFSI and 10% by weight of γ-butyrolactone.

8. Encapsulation

The battery 1 or the assembly, multilayer rigid system formed by one or more assembled cells, possibly impregnated with a phase carrying lithium ions, must then be encapsulated by a suitable method in order to ensure the protection thereof from the atmosphere. The encapsulation system comprises at least one layer, and preferably represents a stack of several layers. If the encapsulation system is composed of a single layer, it must be deposited by ALD or be made of parylene and/or polyimide. These encapsulation layers have to be chemically stable, resist high temperatures and be impermeable to the atmosphere (barrier layer). One of the methods described in patent applications WO 2017/115 032, WO 2016/001584, WO2016/001588 or WO 2014/131997 can be used.

Advantageously, the battery or the assembly, can be covered with an encapsulation system 30 formed by a stack of several layers, namely a sequence, preferably z sequences, comprising:

- a first covering layer, preferably chosen from parylene, parylene of the F type, polyimide, epoxy resins, silicone, polyamide and/or a mixture of the latter, deposited on the stack of anode and cathode foils,
- a second covering layer comprised of an electrically-insulating material, deposited by atomic layer deposition on said first covering layer.

This sequence can be repeated z times with z≥1. This multilayer sequence has a barrier effect. The more the sequence of the encapsulation system is repeated, the more substantial this barrier effect will be. It will be as substantial as the thin layers deposited are numerous.

Advantageously, the first covering layer is a polymer layer, for example made of silicone (deposited for example by impregnation or by plasma-assisted chemical vapor deposition from hexamethyldisiloxane (HMDSO)), or epoxy resin, or polyimide, polyamide, or poly-para-xylylene (more commonly known as parylene), preferably with a parylene and/or polyimide base. This first covering layer makes it possible to protect the sensitive elements of the battery from its environment. The thickness of said first covering layer is, preferably, comprised between 0.5 μm and 3 μm.

Advantageously, the first covering layer can be parylene of the C type, parylene of the D type, parylene of the N type (CAS 1633-22-3), parylene of the F type or a mixture of parylene of the C, D, N and/or F type. Parylene (also called polyparaxylylene or poly(p-xylylene)) is a dielectric, transparent, semi-crystalline material that has high thermodynamic stability, excellent resistance to solvents as well as very low permeability. Parylene also has barrier properties that make it possible to protect the battery from its external environment. The protection of the battery is increased when this first covering layer is made from parylene of the F type. It can be vacuum deposited, by a chemical vapor deposition technique (CVD). This first encapsulation layer is advantageously obtained from the condensation of gaseous monomers deposited by chemical vapor deposition (CVD) on the surfaces, which makes it possible to have a conformal, thin and uniform covering, of all of the accessible surfaces of the object. It makes it possible to follow the variations in volume of the battery during the operation thereof and facilitates the specific cutting of batteries through its elastic properties. The thickness of this first encapsulation layer is comprised between 2 μm and 10 μm, preferably comprised between 2 μm and 5 μm and more preferably about 3 μm. It makes it possible to cover all of the accessible surfaces of the stack, to close only on the surface the access to the pores of these accessible surfaces and to render uniform the chemical nature of the substrate. The first covering layer does not enter into the pores of the battery or of the assembly, as the size of the deposited polymers is too large for them to enter the pores of the stack.

This first covering layer is advantageously rigid; it cannot be considered as a flexible surface. The encapsulation can thus be carried out directly on the stacks, the coating able to penetrate into all the available cavities.

It is reminded here that thanks to the absence of binder in the porosities of the electrolyte according to the invention and/or of the electrodes, the battery can undergo vacuum treatments.

In an embodiment a first layer of parylene is deposited, such as a layer of parylene C, parylene D, a layer of parylene N (CAS No.: 1633-22-3) or a layer comprising a mixture of parylene C, D, and/or N. Parylene (also called polyparaxylylene or poly(p-xylylene)) is a dielectric, transparent, semi-crystalline material that has high thermodynamic stability, excellent resistance to solvents as well as very low permeability.

This layer of parylene makes it possible to protect the sensitive elements of the battery from their environment. This protection is increased when this first encapsulation layer is made from parylene N.

In another embodiment, a first layer with a polyimide base is deposited. This layer of polyimide protects the sensitive elements of the battery from their environment.

In another advantageous embodiment, the first encapsulation layer is comprised of a first layer of polyimide, preferably about 1 μm thick on which is deposited a second layer of parylene, preferably about 2 μm thick. This protection is increased when this second layer of parylene, preferable about 2 μm thick is made from parylene N. The layer of polyimide combined with the layer of parylene improves the protection of the sensitive elements of the battery from their environment.

However, the inventors have observed that this first layer, when it has a parylene base, does not have sufficient stability in the presence of oxygen. When this first layer has a polyimide base, it is not sufficiently sealed, in particular in the presence of water. For these reasons a second layer is deposited which coats the first layer.

Advantageously, a second covering layer comprised of an electrically-insulating material can be deposited by a conformal deposition technique, such as atomic layer deposition (ALD) on the first layer. Thus a conformal covering is obtained on all of the accessible surfaces of the stack covered beforehand with the first covering layer, preferably a first layer of parylene and/or polyimide; this second layer is preferably an inorganic layer. The growth of the layer deposited by ALD is influenced by the nature of the substrate. A layer deposited by ALD on a substrate that has different zones of different chemical natures will have non-homogenous growth, that can generate a loss of integrity of this second protective layer. This second layer deposited on the first layer of parylene and/or of polyimide protects the first layer of parylene and/or of polyimide from the air and improves the duration of the service life of the encapsulated battery.

The deposition techniques by ALD are particularly well suited for covering surfaces that have a high roughness entirely tight and conformal. They make it possible to realize conformal layers, free from defects, such as holes (layers referred to as "pinhole-free"), and represent very good barriers. Their WVTR coefficient is extremely low. The WVTR coefficient (water vapor transmission rate) makes it possible to evaluate the permeance to steam of the encapsulation system. The lower the WVTR coefficient is, the tighter the encapsulation system is. For example, a layer of $Al_2O_3$ of 100 nm thick deposited by ALD has a permeation to steam of 0.00034 $g/m^2 \cdot d$. The second covering layer can be made of a ceramic material, vitreous material or vitroceramic material, for example in form of oxide, of the $Al_2O_3$ type, of nitride, phosphates, oxynitride, or siloxane. This second covering layer has a thickness less than 200 nm, preferably comprised between 5 nm and 200 nm, more preferably comprised between 10 nm and 100 nm, between 10 nm and 50 nm, and more preferably of about fifty nanometers.

This second covering layer deposited by ALD makes it possible on the one hand, to ensure the tightness of the structure, i.e. to prevent the migration of water inside the structure and on the other hand to protect the first covering layer, preferably of parylene and/or polyimide, preferably parylene of the F type, from the atmosphere so as to prevent the degradation thereof.

However, these layers deposited by ALD are very fragile mechanically and require a rigid support surface to ensure their protective role. The deposition of a fragile layer on a flexible surface would lead to the formation of cracks, generating a loss of integrity of this protective layer.

In an embodiment, a third covering layer is deposited on the second covering layer or on an encapsulation system 30 formed by a stack of several layers as described hereinabove, namely a sequence, preferably z sequences of the encapsulation system with z≥1, to increase the protection of the battery cells from their external environment. Typically, this third layer is made of polymer, for example silicone (deposited for example by impregnation or plasma-assisted chemical vapor deposition from hexamethyldisiloxane (HMDSO, CAS No.: 107-46-0)), or epoxy resin, or polyimide, or parylene.

Furthermore, the encapsulation system can comprise an alternating succession of layers of parylene and/or polyimide, preferably about 3 μm thick, and of layers comprised of an electrically-insulating material such as inorganic layers conformally deposited by ALD as described hereinabove to create a multilayer encapsulation system. In order to improve the performance of the encapsulation, the encapsulation system can comprise a first layer of parylene and/or polyimide, preferably about 3 μm thick, a second layer comprised of an electrically-insulating material, preferably an inorganic layer, conformally deposited by ALD on the first layer, a third layer of parylene and/or polyimide, preferably about 3 μm thick deposited on the second layer and a fourth layer comprised of an electrically-insulating material conformally deposited by ALD on the third layer.

The battery or the assembly thus encapsulated in this sequence of the encapsulation system, preferably in z sequences, can then be covered with a last covering layer so as to mechanically protect the stack thus encapsulated and optionally provide it with an aesthetic aspect. This last covering layer protects and improves the service life of the battery. Advantageously this last covering layer is also chosen to resist a high temperature, and has a mechanical resistance that is sufficient to protect the battery during the later use thereof. Advantageously, the thickness of this last covering layer is comprised between 1 μm and 50 μm. Ideally, the thickness of this last covering layer is about 10-15 μm, such a range of thickness makes it possible to protect the battery from mechanical damage.

Advantageously, this last covering layer is deposited on an encapsulation system formed by a stack of several layers as described hereinabove, namely a sequence, preferably z sequences of the encapsulation system with z≥1, preferably on this alternating succession of layers of parylene and/or polyimide, preferably about 3 μm thick and of inorganic layers conformally deposited by ALD, in order to increase the protection of the battery cells from their external environment and protect them from mechanical damage. This last encapsulation layer has, preferably, a thickness of about 10-15 μm. This last covering layer is preferably with a base of epoxy resin, polyethylene naphthalate (PEN), polyimide, polyamide, polyurethane, silicone, sol-gel silica or organic silica. Advantageously, this last covering layer is deposited by dipping. Typically, this last layer is made of polymer, for example silicone (deposited for example by dipping or plasma-assisted chemical vapor deposition from hexamethyldisiloxane (HMDSO)), or epoxy resin, or parylene, or polyimide. For example, a layer of silicone (typical thickness of about 15 μm) can be deposited by injection in order to protect the battery from mechanical damage. These materials resist high temperatures and the battery can thus be assembled easily by welding on electronic boards without the appearance of a vitreous transition. Advantageously, the encapsulation of the battery is carried out on four of the six faces of the stack. The encapsulation layers surround the periphery of the stack, with the rest of the protection from the atmosphere being provided by the layers obtained by the terminations.

After the step of encapsulation, the stack thus encapsulated is then cut according to cut planes making it possible to obtain unit battery components, exposing on each one of the cutting planes anode and cathode connections 50 of the battery, in such a way that the encapsulation system 30 covers four of the six faces of said battery, preferably continuously, so that the system can be assembled without welding, with the other two faces of the battery being covered later by the terminations 40.

In an advantageous embodiment, the stack thus encapsulated and cut, can be impregnated, in an anhydrous atmosphere, with a phase carrying lithium ions such as an ionic liquid containing lithium salts, possibly diluted in an organic solvent or a mixture of organic solvents containing a lithium salt that can be different from the one dissolved in the ionic liquid, as presented in paragraph 10 of the present application. The impregnation can be carried out by dipping in an electrolytic solution such as an ionic liquid containing lithium salts, possibly diluted in an organic solvent or a mixture of organic solvents containing a lithium salt that can be different from the one dissolved in the ionic liquid. The ionic liquid enters instantly by capillarity in the porosities.

After the step of encapsulation, cutting and possibly impregnation of the battery, terminations 40 are added to establish the electrical contacts required for the proper operation of the battery.

9. Termination

Advantageously, the battery comprises terminations 40 at where the cathode, respectively anode, current collectors are apparent. Preferably, the anode connections and the cathode connections are on the opposite side of the stack. On and around these connections 50 is deposited a termination system 40. The connections can be metalized using plasma deposition techniques known to those skilled in the art, preferably by ALD and/or by immersion in a conductive epoxy resin (charged with silver) and/or a molten bath of tin. Preferably, the terminations are formed from a stack of layers successively comprising a first thin electronically-conductive covering layer, preferably metal, deposited by ALD, a second epoxy resin layer charged with silver deposited on the first layer and a third layer with a tin base deposited on the second layer. The first conductive layer deposited by ALD is used to protect the section of the battery from humidity. This first conductive layer deposited by ALD is optional. It makes it possible to increase the calendar service life of the battery by reducing the WVTR at the termination. This first thin covering layer can in particular be metal or with a metal nitride base. The second layer made of epoxy resin charged with silver makes it possible to provide the “flexibility” for the connections without breaking the electrical contact when the electric circuit is subjected to thermal and/or vibratory stresses.

The third metallization layer with a tin base is used to ensure the weldability of the battery. In another embodiment, this third layer can be comprised of two layers of different materials. A first layer coming into contact with the epoxy resin layer charged with silver. This layer is made of nickel and is carried out by electrolytic deposition. The layer of nickel is used as a heat barrier and protects the rest of the component from the diffusion during the assembly steps by remelting. The last layer, deposited on the nickel layer is also a metallization layer, preferably made of tin in order to render the interface compatible with assemblies via remelting. This layer of tin can be deposited either by dipping in a molten tin bath or by electrodeposition; these techniques are known as such.

For certain assemblies on copper tracks by micro-wiring, it may be necessary to have a last metallization layer made of copper. Such a layer can be realized by electrodeposition in place of tin.

In another embodiment, the terminations 40 can be formed from a stack of layers successively comprising a layer made of epoxy resin charged with silver and a second layer with a tin or nickel base deposited on the first layer.

In another embodiment, the terminations 40 can be formed from a stack of layer that successively comprise a layer of epoxy resin charged with silver, a second layer with a nickel base deposited on the first layer and a third layer with a tin or copper base.

In another preferred embodiment, the terminations 40 are formed, at the edges of the cathode and anode connections, from a first stack of layers that successively comprise a first layer made from a material charged with graphite, preferably epoxy resin charged with graphite, and a second layer comprising metal copper obtained from an ink charged with nanoparticles of copper deposited on the first layer. This first stack of terminations is then sintered by infrared flash lamp in such a way as to obtain a covering of the cathode and anode connections by a layer of metal copper.

According to the final use of the battery, the terminations can comprise, additionally, a second stack of layers disposed on the first stack of the terminations successively comprising a first layer of a tin-zinc alloy deposited, preferably by dipping in a molten tin-zinc bath, so as to ensure the tightness of the batter at least cost and a second layer with a pure tin base deposited by electrodeposition or a second layer comprising an alloy with a silver, palladium and copper base deposited on this first layer of the second stack.

The terminations 40 make it possible to take the alternating positive and negative electrical connections on each one of the ends of the battery. These terminations 40 make it possible to create the electrical connections in parallel between the different elements of the battery. For this, only the cathode connections 50 exit on one end, and the anode connections 50 are available on another end.

In another preferred embodiment, a lithium-ion battery is manufactured according to the invention by the method comprising the following steps:

(1) a colloidal suspension is provided, containing aggregates or agglomerates of nanoparticles of at least one inorganic material, said aggregates or agglomerates having an average diameter comprised between 80 nm and 300 nm (preferably between 100 nm to 200 nm),
(2) at least one electrode is provided,
(3) at least one porous inorganic layer is deposited on said electrode by electrophoresis, by ink-jet, by doctor blade, by roll coating, by curtain coating or by dip-coating, from a suspension of particles of inorganic material obtained in step (1);
(4) said porous inorganic layer is dried, preferably in an airflow to obtain a porous inorganic layer;
(5) said porous inorganic layer is treated by mechanical compression and/or heat treatment,
(6) optionally, said porous inorganic layer obtained in step (5) is impregnated with a phase carrying lithium ions.
(7) a stack comprising an alternating succession of cathode and anode in thin layers, preferably offset laterally, is carried out, in such a way that at least one porous inorganic layer is disposed between a cathode layer and an anode layer, (8) the stack is consolidated by mechanical compression and/or heat treatment in order to obtain an assembled stack, (9) optionally, the assembled stack obtained in step (8) comprising said porous inorganic layer is impregnated with a phase carrying lithium ions.

After step (9) of the method of manufacturing a lithium-ion battery according to the invention:

is deposited successively, alternating, on the assembled stack, an encapsulation system formed by a succession of layers, namely a sequence, preferably z sequences, comprising:

a first covering layer, preferably chosen from parylene, parylene of the F type, polyimide, epoxy resins, silicone, polyamide and/or a mixture of the latter, deposited on the assembled stack, a second covering layer comprised of an electrically-insulating material, deposited by atomic layer deposition on said first covering layer, this sequence can be repeated z times with $z \geq 1$, a last covering layer is deposited in this succession of layers of a material chosen from epoxy resin, polyethylene naphthalate (PEN), polyimide, polyamide, polyurethane, silicone, sol-gel silica or organic silica, the assembled stack thus encapsulated is cut along two cutting planes to expose on each one of the cutting plans anode and cathode connections of the assembled stack, in such a way that the encapsulation system covers four of the six faces of said assembled stack, preferably continuously, in such a way as to obtain an elementary battery, optionally, the encapsulated and cut elementary battery is impregnated with a phase carrying lithium ions, is deposited successively, on and around, these anode and cathode connections:

a first layer of a material charged with graphite, preferably epoxy resin charged with graphite, a second layer comprising metal copper obtained from an ink charged with nanoparticles of copper deposited on the first layer, the layers obtained are thermally treated, preferably by infrared flash lamp in such a way as to obtain a covering of the cathode and anode connections by a layer of metal copper, possibly, is deposited successively, on and around, this first stack of terminations, a second stack comprising:

a first layer of a tin-zinc alloy deposited, preferably by dipping in a molten tin-zinc bath, so as to ensure the tightness of the battery at least cost, and a second layer with a pure tin base deposited by electrodeposition or a second layer comprising an alloy with a silver, palladium and copper base deposited on this first layer of the second stack.

In this method, the deposition of a layer of electronically-insulating material, preferably ion conducting by ALD or by chemical solution deposition CSD can be carried out after treatment of the porous inorganic layer by mechanical compression and/or heat treatment, after consolidation of the stack by mechanical compression and/or heat treatment making it possible to obtain an assembled stack or after cutting according to two cutting planes, of the assembled stack making it possible to expose on each one of the cutting planes the anode and cathode connections of the assembled stack. This deposition of a layer of electronically-insulating material, preferably ion conducting is advantageously carried out before any step of impregnation of the porous inorganic layer with a phase carrying lithium ions. This deposition preferably has a thickness less than 5 nm.

In this method, the impregnation of the porous inorganic layer with a phase carrying lithium ions can be carried out after treatment of the porous inorganic layer by mechanical compression and/or heat treatment, after consolidation of the stack by mechanical compression and/or heat treatment making it possible to obtain an assembled stack or after cutting according to two cutting planes, of the assembled stack making it possible to expose on each one of the cutting planes the anode and cathode connections of the assembled stack. In another preferred embodiment, a lithium-ion battery is manufactured according to the invention by the same method as that indicated hereinabove, except for step 1) which comprises the following steps:

(1a) a colloidal suspension is provided including nanoparticles of at least one inorganic material P with a primary diameter $D_{50}$ less than or equal to 50 nm;

(1b) the nanoparticles present in said colloidal suspension are destabilized so as to form aggregates or agglomerates of particles with an average diameter comprised between 80 nm and 300 nm, preferably between 100 nm and 200 nm, said destabilization being done preferably by adding a destabilizing agent such as a salt, preferably LiOH.

Advantageously, the anode and cathode connections are on the opposite sides of the stack.

All the embodiments relating to the assembly of the battery, the impregnating of the porous inorganic layer, the deposition of the encapsulation system and of the terminations described hereinabove can be combined together independently of one another, if this combination is realistic for those skilled in the art.

EXAMPLES

Example 1: Carrying Out of a Mesoporous Electrolyte Layer with a $Li_3PO_4$ Base Deposited onto a Cathode Layer a. Carrying out of a suspension of nanoparticles of $Li_3PO_4$ Two solutions were prepared:

11.44 g of $CH_3COOLi$, $2H_2O$ were dissolved in 112 ml of water, then 56 ml of water were added under intense stirring to the medium in order to obtain a solution A.

4.0584 g of $H_3PO_4$ were diluted in 105.6 ml of water, then 45.6 ml of ethanol were added to this solution in order to obtain a second solution called hereinafter solution B.

Solution B was then added, under intense stirring, to solution A.

The solution obtained, perfectly limpid after the disappearance of bubbles formed during the mixing, was added to 1.2 liters of acetone under the action of a homogenizer of the Ultraturrax™ type in order to homogenize the medium. A white precipitation in suspension in the liquid phase was immediately observed.

The reaction medium was homogenized for 5 minutes then was maintained 10 minutes under magnetic stirring. It was left to decant for 1 to 2 hours. The supernatant was discarded then the remaining suspension was centrifuged 10 minutes at 6000 rpm. Then 300 ml of water was added to put the precipitate back into suspension (use of a sonotrode, magnetic stirring). Under intense stirring, 125 ml of a solution of sodium tripolyphosphate 100 g/l was added to the colloidal suspension thus obtained. The suspension thus became more stable. The suspension was then sonicated using a sonotrode. The suspension was then centrifuged 15 minutes at 8000 rpm. The base was then redispersed in 150 ml of water. Then the suspension obtained was again centrifuged 15 minutes at 8000 rpm and the bases obtained redispersed in 300 ml of ethanol in order to obtain a suspension able to realize an electrophoretical deposition.

Agglomerates of about 100 nm formed from primary particles of $Li_3PO_4$ of 10 nm were thus obtained in suspension in the ethanol.

b. Carrying out of a porous inorganic layer according to the invention with a base of a suspension of nanoparticles of $Li_3PO_4$ i. Carrying out of a mesoporous cathode with a $LiCoO_2$ base A suspension of crystalline nanoparticles of $LiCoO_2$ was prepared by hydrothermal synthesis. For 100 ml of suspension, the reaction mixture was carried out by adding 20 ml of an aqueous solution at 0.5M of cobalt nitrate hexahydrate added under stirring in 20 ml of a solution at 3M of lithium hydroxide monohydrate followed by the drop-by-drop addition of 20 ml of $H_2O_2$ at 50%. The reaction mixture was placed in an autoclave at 200° C. for 1 hour; the pressure in the autoclave reached about 15 bars.

A black precipitate was obtained in suspension in the solvent. This precipitate was subjected to a succession of centrifugation—redispersion steps in the water, until a suspension was obtained with a conductivity of about 200 µS/cm and a zeta potential of −30 mV. The size of the primary particles was about 10 nm to 20 nm and the aggregates has a size comprised between 100 nm and 200 nm. The product was characterized by diffraction with X-rays and electron microscopy.

These aggregates were deposited by electrophoresis on stainless steel foils of a thickness of 5 µm, in an aqueous medium, by applying pulsed currents of 0.6 A at peak and 0.2 A on the average; the voltage applied was about 4 to 6 V for 400 s. A deposition of about 4 µm thick was thus obtained. It was consolidated at 600° C. for 1 h in air so as to weld the nanoparticles together, to improve the adherence to the substrate and to prefect the recrystallization of the $LiCoO_2$.

ii. Carrying Out of a Mesoporous Anode with a $Li_4Ti_5O_{12}$ Base:

A suspension of nanoparticles of $Li_4Ti_5O_{12}$ was prepared by glycothermal synthesis: 190 ml of 1,4-butanediol were poured into a beaker, and 4.25 g of lithium acetate was added under stirring. The solution was maintained under stirring until the acetate was fully dissolved. 16.9 g of titanium butoxide were taken under inert atmosphere and introduced into the acetate solution. The solution was then stirred for a few minutes before being transferred into an autoclave that was filled beforehand with an additional 60 ml of butanediol. The autoclave was then closed and purged of the nitrogen for at least 10 minutes. The autoclave was then heated to 300° C. at a speed of 3° C./min and maintained at this temperature for 2 hours, under stirring. At the end, it was left to cool, still under stirring.

Figure 2A:
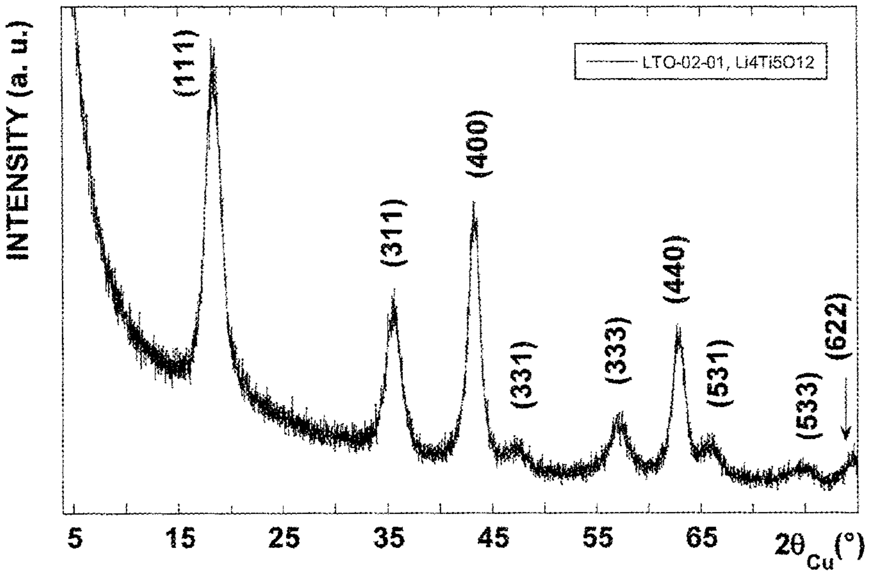
Figure 2B:
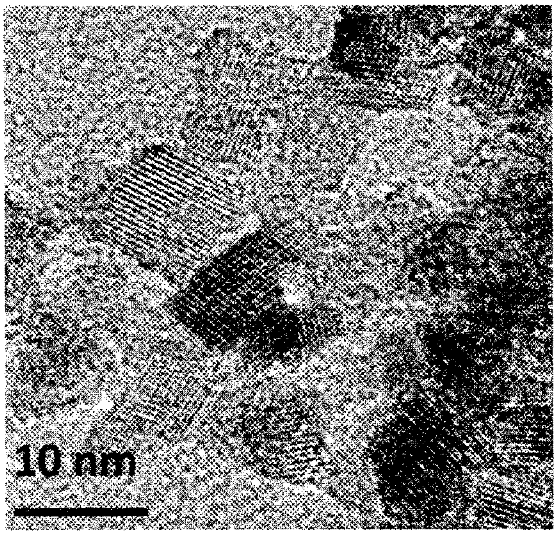
Figure 3:
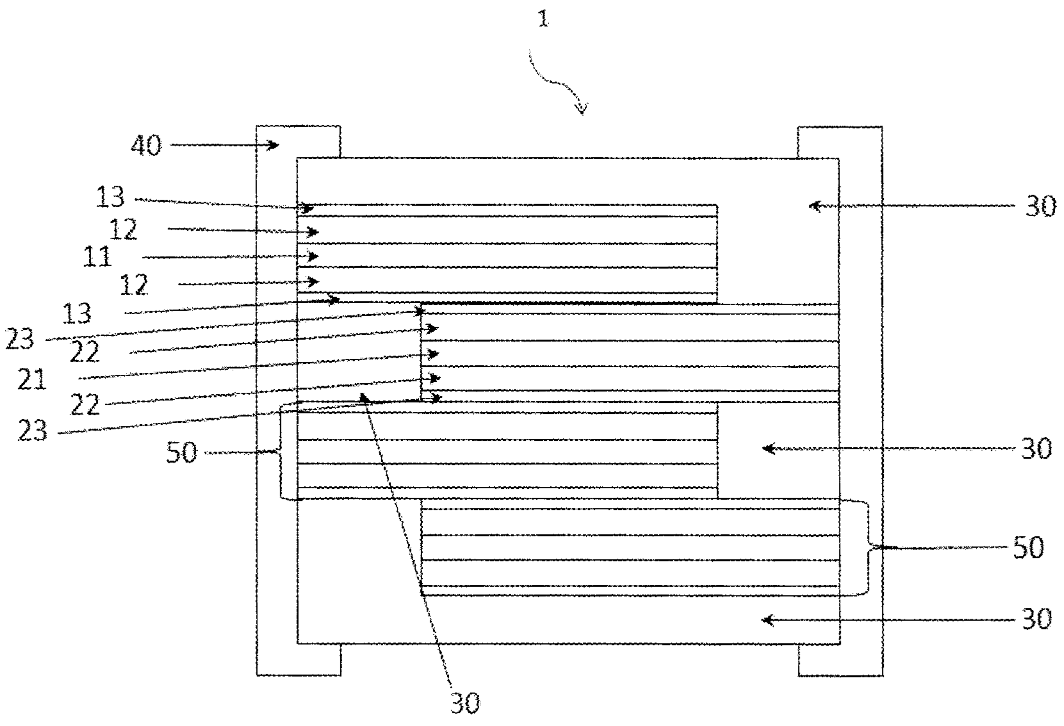
FIG. 3 diagrammatically shows a front view with the pulling-out of a battery comprising an electrolyte according to the invention and showing the structure of the battery comprising an assembly of elementary cells covered by a system of encapsulation and terminations.

A white precipitate was obtained in suspension in the solvent. This precipitate was subjected to a succession of centrifugation—redispersion steps in the ethanol in order to obtain a pure colloidal suspension, with a low ionic conductivity. It included aggregates of about 150 nm formed from primary particles of 10 nm. The zeta potential was about −45 mV. The product was characterized by diffraction with X-rays and electron microscopy. FIG. 2(*a*) shows a diffractogram, FIG. 2(*b*) a snapshot obtained by transmission electron microscopy of primary nanoparticles These aggregates were deposited by electrophoresis on stainless steel foils of a thickness of 5 µm, in an aqueous medium, by applying pulsed currents of 0.6 A at peak and 0.2 A on the average; the voltage applied was about 3 to 5 V for 500 s. A deposition of about 4 µm thick was thus obtained. It was consolidated by RTA annealing at 40% power for 1 h in nitrogen so as to weld the nanoparticles together, to improve the adherence to the substrate and to prefect the recrystallization of the $Li_4Ti_5O_{12}$.

iii. Carrying Out on the Previously Developed Anode and Cathode Layers of a Porous Inorganic Layer from the Suspension of Nanoparticles of $Li_3PO_4$ Described Hereinabove in Part a)

Thin porous layers of $Li_3PO_4$ were then deposited by electrophoresis on the surface of the previously developed anode and cathode by applying an electric field of 20V/cm to the suspension of nanoparticles of $Li_3PO_4$ obtained hereinabove, for 90 seconds in order to obtain layer about 1.5 µm thick. This layer was dried in the air at 120° C. in order to remove any trace of organic residue, and was then calcinated at 350° C. for one hour in air.

Example 2: Carrying Out of an Electrochemical Cell

After having deposited 1.5 µm of porous $Li_3PO_4$ on the each one of the electrodes ($LiCoO_2$ and $Li_4Ti_5O_{12}$) developed beforehand, the two sub-systems were stacked in such a way that the films of $Li_3PO_4$ were in contact. This stack was then vacuum hot pressed.

To do this, the stack was placed under a pressure of 1.5 MPa then vacuum dried for 30 minutes at $10^{-3}$ bar. The press platens were then heated to 450° C. with a speed of 4° C./seconds. At 450° C., the stack was then thermo-compressed under a pressure of 45 MPa for 1 minute, then the system was cooled to ambient temperature.

Once the assembly is carried out, a rigid, multilayer system formed from one or more assembled battery cells was obtained.

This assembly was then impregnated in an electrolytic solution comprising PYR14TFSI and LiTFSI at 0.7 M. The ionic liquid enters instantly by capillarity in the porosities. The system was maintained in immersion for 1 minute, then the surface of the stack of cells was dried by a curtain of $N_2$.

The invention claimed is:

1. An electrochemical device comprising an electrolyte layer and an electrode, said electrolyte layer comprising a porous inorganic layer impregnated with a phase carrying lithium ions, characterized in that said porous inorganic layer comprises an inorganic electrolyte material and has an interconnected network of open pores, the open pores of said porous inorganic layer have an average diameter $D_{50}$ less than 100 nm, the open pores of said porous inorganic layer have a volume greater than 25% of the total volume of the electrolyte layer; and said porous inorganic layer is in contact with said electrode and comprises a three-dimensional network of interconnected particles of the at least one inorganic electrolyte material having an average primary diameter $D_{50}$ less than 50 nm, said electrolyte layer is organic binder-free, and said inorganic electrolyte material is selected in the group formed by:

garnets of formula $Li_dA^1_xA^2_y(TO_4)_z$ where $A^1$ represents a cation of oxidation state +II; and where $A^2$ represents a cation of oxidation state +III; and where $(TO_4)$ represents an anion wherein T is an atom of oxidation state +IV, located at the center of a tetrahedron formed by the oxygen atoms, knowing that all or a portion of the elements T of an oxidation state +IV can be replaced by atoms of an oxidation state +III or +V;

knowing that: d is comprised between 2 and 10, x is comprised between 2.6 and 3.4 y is comprised between 1.7 and 2.3 and z is comprised between 2.9 and 3.1;

lithium phosphates;

lithium borates;

lithium oxynitrides;

lithium oxides, lithium silicates;

solid electrolytes chosen from: $Li_3OA$ with A a halide or a mixture of halides; $Li_{(3-x)}M_{x/2}OA$ with $0<x<3$, M a divalent metal, A a halide or a mixture of halides; $Li_{(3-x)}M^3_{x/3}OA$ with $0<x<3$, $M^3$ a trivalent metal, A a halide or a mixture of halides; or $LiCOX_zY_{(1-z)}$, with X and Y halides, and $0 \leq z \leq 1$, the compounds $La_{0.51}Li_{0.34}Ti_{2.94}$, $Li_{3.4}V_{0.4}Ge_{0.6}O_4$, $Li_2O—Nb_2O_5$, $LiAlGaSPO_4$;

formulations based on $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where $0<x<1$), $Li_{1+x+y}Al_xTi_{2-x}Si_yP_{3-y}O_{12}$ (where $0 \leq x \leq 1$ and $0 \leq y \leq 1$).

2. The electrochemical device according to claim 1, characterized in that the open pores of said porous inorganic layer have a volume comprised between 30% and 50% of the total volume of the electrolyte layer.

3. The electrochemical device according to claim 1, characterized in that the open pores of said porous inorganic layer are impregnated with a phase carrying lithium ions, such an organic solvent or a mixture of solvents wherein at least one lithium salt is dissolved, and/or a polymer containing at least one lithium salt, and/or an ionic liquid or a mixture of ionic liquids, possibly diluted with a suitable solvent, containing at least one lithium salt.

4. The electrochemical device according to claim 1, characterized in that the open pores of said porous inorganic layer are impregnated with a phase carrying lithium ions comprising at least 50% by weight of at least one ionic liquid.

5. The electrochemical device according to claim 1, said device being a lithium-ion battery or a supercapacitor.

6. The electrochemical device according to claim 1, wherein the thickness of the electrolyte layer is less than 10 μm.

7. The electrochemical device according to claim 6, wherein the thickness of the electrolyte layer is between 2.5 μm and 4.5 μm.

* * * * *